(12) United States Patent
Jeong et al.

(10) Patent No.: US 11,963,125 B2
(45) Date of Patent: Apr. 16, 2024

(54) METHOD AND APPARATUS FOR MEASUREMENT OF TAI UPDATES IN AN NTN

(71) Applicant: Samsung Electronics Co., Ltd., Suwon-si (KR)

(72) Inventors: Kyeongin Jeong, Allen, TX (US); Nishithkumar D. Tripathi, Parker, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 17/568,669

(22) Filed: Jan. 4, 2022

(65) Prior Publication Data

US 2022/0225265 A1 Jul. 14, 2022

Related U.S. Application Data

(60) Provisional application No. 63/148,578, filed on Feb. 11, 2021, provisional application No. 63/146,521,
(Continued)

(51) Int. Cl.
*H04W 60/04* (2009.01)
*G01S 19/52* (2010.01)
(Continued)

(52) U.S. Cl.
CPC ............ *H04W 60/04* (2013.01); *G01S 19/52* (2013.01); *G01S 19/53* (2013.01); *H04W 76/20* (2018.02); *H04W 84/06* (2013.01)

(58) Field of Classification Search
None
See application file for complete search history.

(56) References Cited

U.S. PATENT DOCUMENTS

| 2011/0130139 A1* | 6/2011 | Ali | G04R 20/18 |
| | | | 455/435.1 |
| 2013/0303160 A1* | 11/2013 | Fong | H04W 16/14 |
| | | | 455/426.1 |

(Continued)

FOREIGN PATENT DOCUMENTS

| WO | 2020034324 A1 | 2/2020 |
| WO | 2020200010 A1 | 10/2020 |

OTHER PUBLICATIONS

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.
(Continued)

*Primary Examiner* — Lonnie V Sweet

(57) ABSTRACT

Methods and apparatuses of UE for measurement of TAI updates in an NTN. A method of a UE comprises: receiving, from a BS, an SIB including multiple TAIs and an indication of whether to include a UE location in an NAS registration/tracking area update operation; determining whether to include the UE location based on the indication; identifying information for the UE location; generating a radio resource control (RRC) message including the information for the UE location, wherein the RRC message encapsulates a NAS message; and transmitting, to the BS, the RRC message including the information for the UE location.

20 Claims, 19 Drawing Sheets

Related U.S. Application Data filed on Feb. 5, 2021, provisional application No. 63/145,064, filed on Feb. 3, 2021, provisional application No. 63/143,567, filed on Jan. 29, 2021, provisional application No. 63/142,310, filed on Jan. 27, 2021, provisional application No. 63/137,457, filed on Jan. 14, 2021, provisional application No. 63/135,333, filed on Jan. 8, 2021.

(51) Int. Cl.
  *G01S 19/53* (2010.01)
  *H04W 76/20* (2018.01)
  *H04W 84/06* (2009.01)

(56) References Cited

U.S. PATENT DOCUMENTS

| | | | |
|---|---|---|---|
| 2018/0343566 A1* | 11/2018 | Yu | H04W 12/041 |
| 2018/0376321 A1 | 12/2018 | Jin et al. | |
| 2020/0396000 A1 | 12/2020 | Ryu et al. | |
| 2020/0396711 A1* | 12/2020 | He | H04W 64/003 |
| 2021/0144669 A1* | 5/2021 | Edge | H04W 36/32 |
| 2022/0022155 A1 | 1/2022 | Wang et al. | |

OTHER PUBLICATIONS

"5G; NR; Radio Resource Control (RRC); Protocol specification (3GPP TS 38.331 version 16.2.0 Release 16)", ETSI TS 138 331 V16.2.0, Nov. 2020, 908 pages.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.2.0, Sep. 2020, 1,149 pages.

"5G; NR; User Equipment (UE) procedures in idle mode and in RRC Inactive state (3GPP TS 38.304 version 16.2.0 Release 16)", ETSI TS 138 304 V16.2.0, Nov. 2020, 41 pages.

"LTE; Evolved Universal Terrestrial Radio Access (E-UTRA); User Equipment (UE) procedures in idle mode (3GPP TS 36.304 version 16.2.0 Release 16)", ETSI TS 136 304 V16.2.0, Nov. 2020, 66 pages.

"5G; NR; Requirements for support of radio resource management (3GPP TS 38.133 version 16.5.0 Release 16)", ETSI TS 138 133 V16.5.0, Dec. 2020, 1,610 pages.

"LTE; Evolved Universal Terrestrial Radio Access (E-UTRA); Requirements for support of radio resource management (3GPP TS 36.133 version 16.7.0 Release 16)", ETSI TS 136 133 V16.7.0, Dec. 2020, 3,706 pages.

3GPP TS 38.321 V16.2.0 (Sep. 2020), Technical Specification, 3rd Generation Partnership Project; Technical Specification Group Radio Access Network; NR; Medium Access Control (MAC) protocol specification, (Release 16), Sep. 2020, 154 pages.

"LTE; Evolved Universal Terrestrial Radio Access (E-UTRA); Medium Access Control (MAC) protocol specification (3GPP TS 36.321 version 16.2.0 Release 16)", ETSI TS 136 321 V16.2.0, Nov. 2020, 144 pages.

"5G; NG-RAN; Xn Application Protocol (XnAP) (3GPP TS 38.423 version 16.3.0 Release 16)", ETSI TS 138 423 V16.3.0, Nov. 2020, 449 pages.

International Search Report and Written Opinion dated Apr. 21, 2022 regarding Application No. PCT/KR2022/000271, 6 pages.

\* cited by examiner

METHOD AND APPARATUS FOR MEASUREMENT OF TAI UPDATES IN AN NTN

CROSS-REFERENCE TO RELATED APPLICATIONS AND CLAIM OF PRIORITY

The present application claims priority to: U.S. Provisional Patent Application No. 63/135,333, filed on Jan. 8, 2021; U.S. Provisional Patent Application No. 63/137,457, filed on Jan. 14, 2021; U.S. Provisional Patent Application No. 63/142,310, filed on Jan. 27, 2021; U.S. Provisional Patent Application No. 63/143,567, filed on Jan. 29, 2021; U.S. Provisional Patent Application No. 63/145,064, filed on Feb. 3, 2021; U.S. Provisional Patent Application No. 63/146,521, filed on Feb. 5, 2021; and U.S. Provisional Patent Application No. 63/148,578, filed on Feb. 11, 2021. The contents of the above-identified patent documents are incorporated herein by reference.

TECHNICAL FIELD

The present disclosure relates generally to wireless communication systems and, more specifically, the present disclosure relates to measurement of tracking area identify (TAI) updates in a non-terrestrial network (NTN).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to measurement of TAI updates in an NTN.

In one embodiment, a user equipment (UE) in a wireless communication system is provided. The UE comprises a transceiver configured to receive, from a base station (BS), system information block (SIB) including multiple TAIs and an indication of whether to include a UE location in a non-access stratum (NAS) registration/tracking area update operation. The UE further comprises a processor operably coupled to the transceiver, the processor configured to: determine whether to include the UE location based on the indication; identify information for the UE location; and generate a radio resource control (RRC) message including the information for the UE location, wherein the RRC message encapsulates a NAS message. The transceiver of the UE is further configured to transmit, to the BS, the RRC message including the information for the UE location.

In another embodiment, a method of a UE in a wireless communication system is provided. The method comprises: receiving, from a BS, an SIB including multiple TAIs and an indication of whether to include a UE location in a NAS registration/tracking area update operation; determining whether to include the UE location based on the indication; identifying information for the UE location; generating an RRC message including the information for the UE location, wherein the RRC message encapsulates a NAS message; and transmitting, to the BS, the RRC message including the information for the UE location.

In yet another embodiment, a BS in a wireless communication system is provided. The BS comprises a processor configured to generate an indication indicating whether to include a UE location. The UE further comprises a transceiver operably coupled to the processor, the transceiver configured to: transmit, to a UE, an SIB including multiple TAIs and the indication in a NAS registration/tracking area update operation, and receive, from the UE, an RRC message including information for the UE location, wherein the RRC message encapsulates a NAS message.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TR38.821 v.16.0.0, "Solutions for NR to support non-terrestrial networks (NTN)"; 3GPP TS38.331 v.16.2.0, "Radio Resource Control (RRC) protocol specification"; 3GPP TS36.331 v.16.2.0, "Radio Resource Control (RRC) protocol specification"; 3GPP TS38.304 v.16.2.0, "User Equipment (UE) procedures in Idle mode and RRC Inactive state"; 3GPP TS36.304 v.16.2.0, "User Equipment (UE) procedures in idle mode"; 3GPP TS38.133 v.16.5.0, "NR-Requirements for Support of Radio Resource Management"; 3GPP TS36.133, v.16.7.0, "Requirements for Support of Radio Resource Management"; 3GPP, TS38.321 v.16.2.0, "Medium Access Control (MAC) protocol specification"; 3GPP TS36.321 v.16.2.0, "Medium Access Control (MAC) protocol specification"; and 3GPP TS38.423 v.16.3.0, "Xn application protocol (XnAP)."

Figure 1:
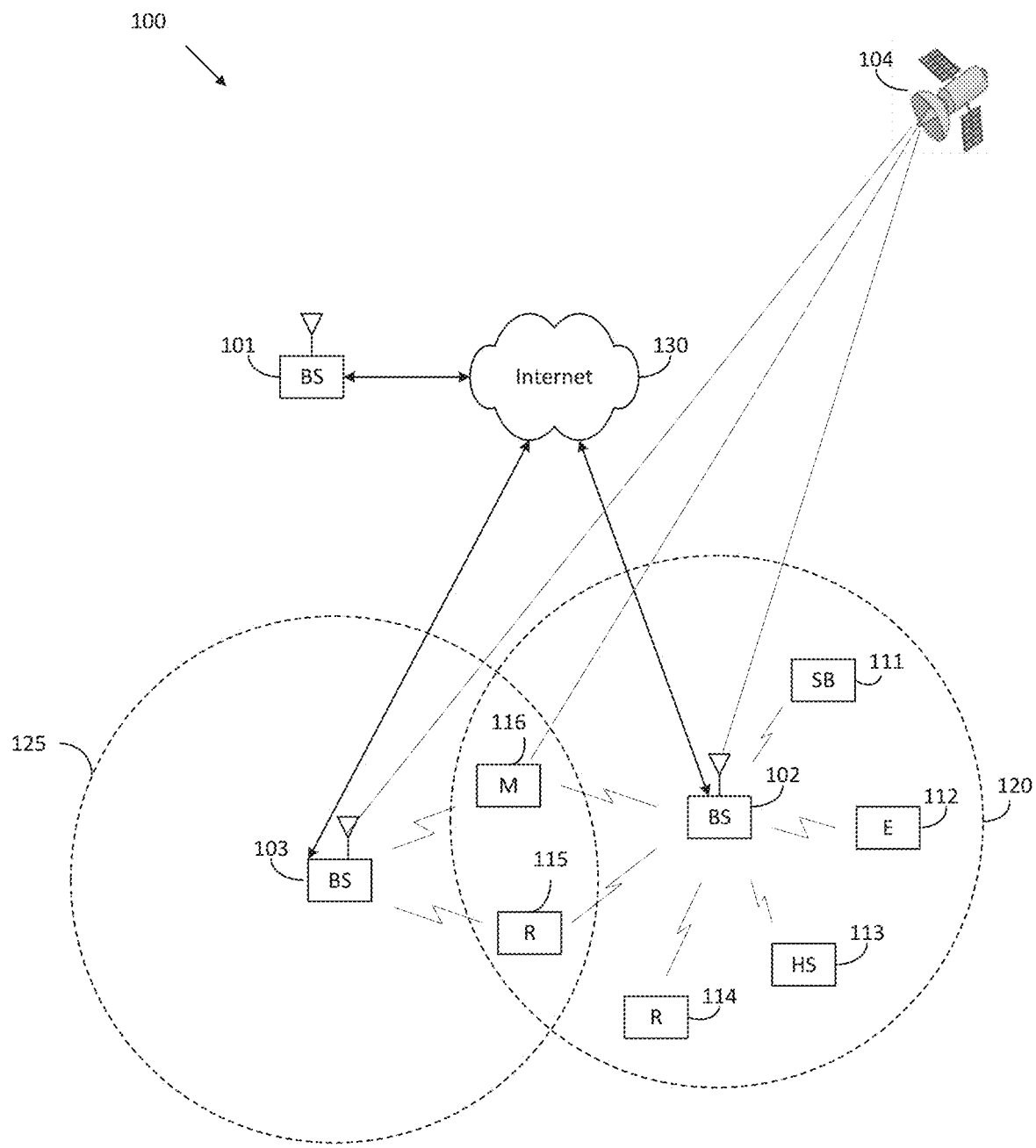
FIG. 1 illustrates an example wireless network according to embodiments of the present disclosure.
Figure 2:
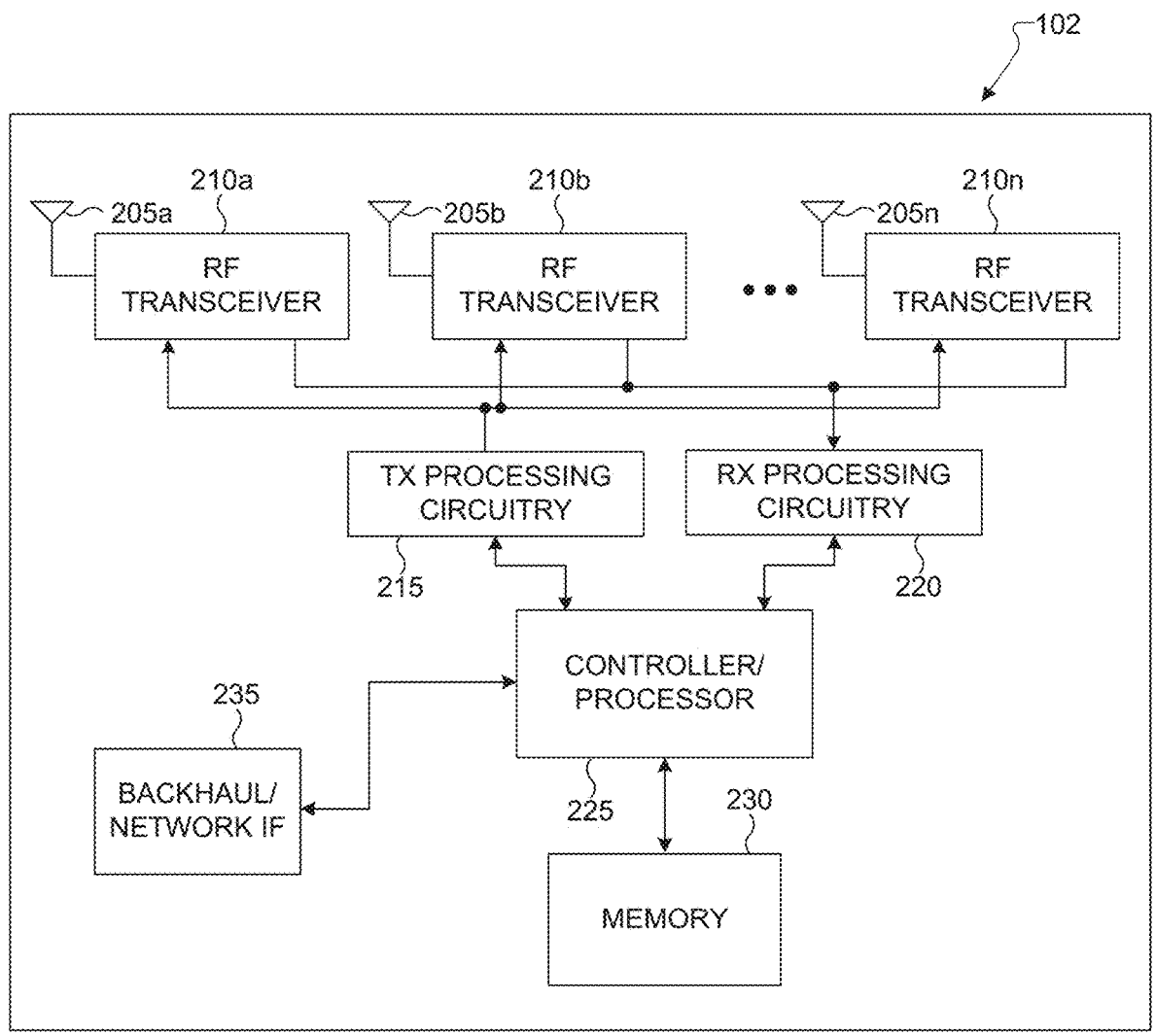
FIG. 2 illustrates an example gNB according to embodiments of the present disclosure.
Figure 3:
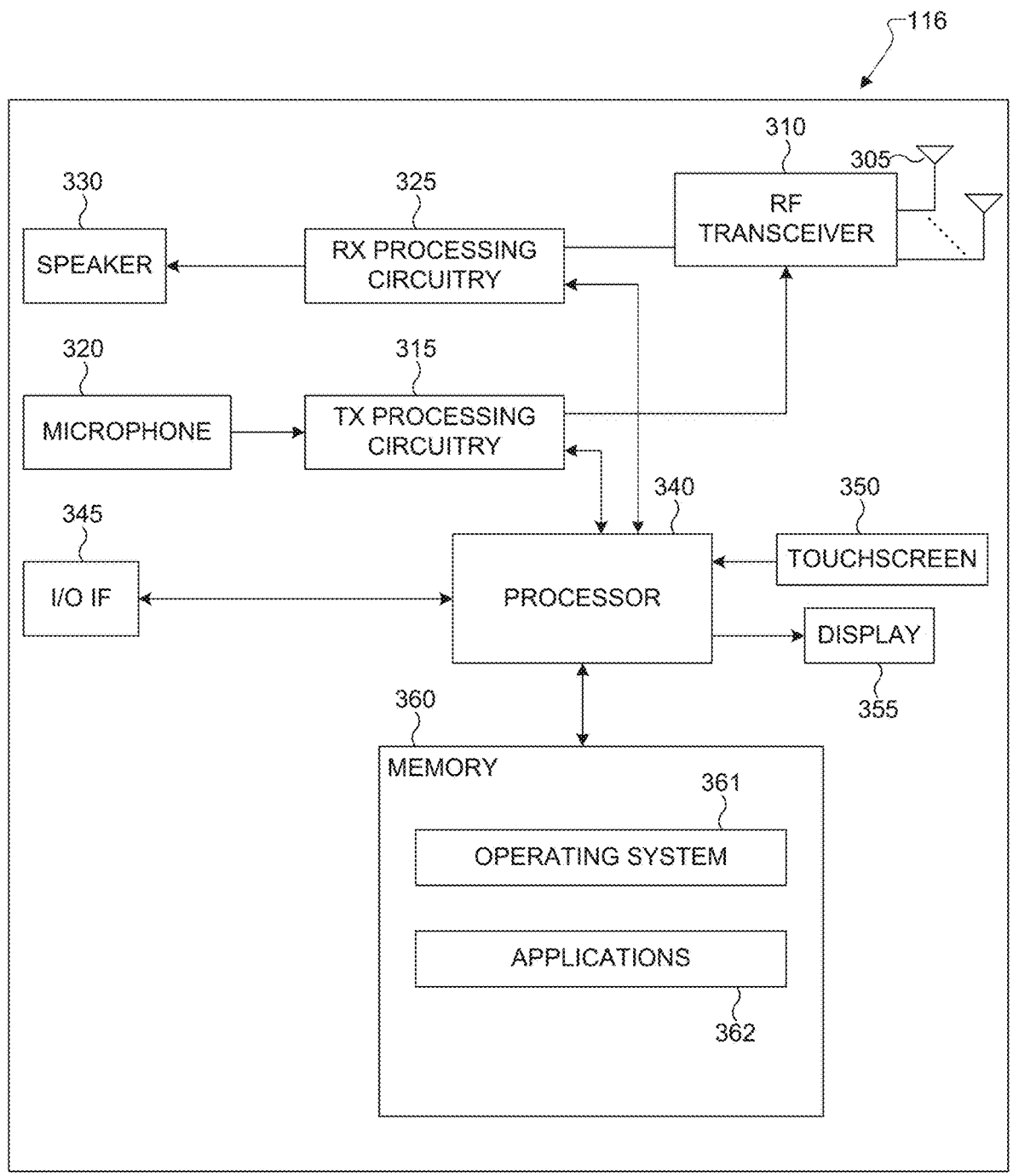
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for receiving system information including: information corresponding to location coordinates for a NTN gateway; information corresponding to a processing delay between the UE and a BS; and information corresponding to a reference point location; determining a timing advance based on a timing difference between the reference point location and the BS; and transmitting a timing advance report based on the determined timing advance. One or more of the gNBs 101-103 includes circuitry, programing, or a combination thereof, for generating system information including: information corresponding to location coordinates for a NTN gateway; information corresponding to a processing delay between a UE and a base station; and information corresponding to a reference point location; transmitting the system information; and receiving a timing advance report based on a timing advance, wherein the timing advance is based on a timing difference between the reference point location and the base station.

As discussed in greater detail below, the wireless network 100 may have communications facilitated via one or more communication satellite(s) 104 that may be in obit over the earth as part of an NTN. The communication satellite(s) 104 can communicate directly with the BSs 102 and 103 to provide network access, for example, in situations where the BSs 102 and 103 are remotely located or otherwise in need of facilitation for network access connections beyond or in addition to traditional fronthaul and/or backhaul connections. Various of the UEs (e.g., as depicted by UE 116) may be capable of at least some direct communication and/or localization with the communication satellite(s) 104, for example, to receive positional information or coordinates.

As described in more detail below, one or more of the UEs 111-116 include circuitry, programing, or a combination thereof, for measurement of TAI updates in an NTN. In certain embodiments, and one or more of the gNBs 101-103 includes circuitry, programing, or a combination thereof, for measurement of TAI updates in an NTN. Further, the network 100 could be an NTN in which one or more of the gNBs 101-103 are replaced by or receive network access via a non-terrestrial node such as a satellite.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection (e.g., a wireless network link including a non-terrestrial node). When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support measurement of TAI updates in an NTN. For example, the gNB 102 may be or may receive network access via a non-terrestrial node such as a satellite. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for measurement of TAI updates in an NTN. For example, in various embodiments, the UE 116 may communicate directly or indirectly with a non-terrestrial node such as a satellite. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave)

bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling.

A DMRS is transmitted only in the BW of a respective PDCCH or PDSCH and a UE can use the DMRS to demodulate data or control information.

Figure 4:
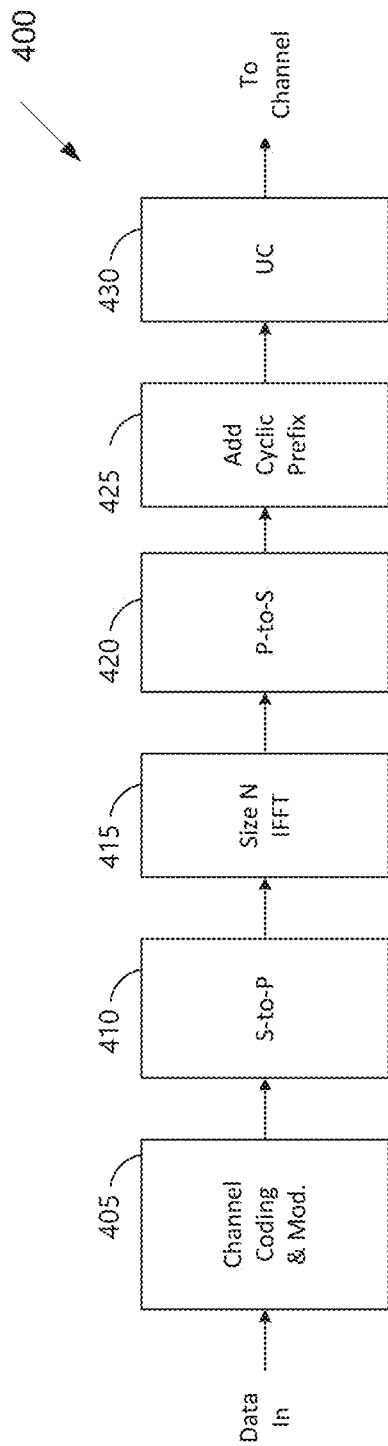
FIGS. 4 and 5 illustrate examples wireless transmit and receive paths according to this disclosure.
Figure 5:
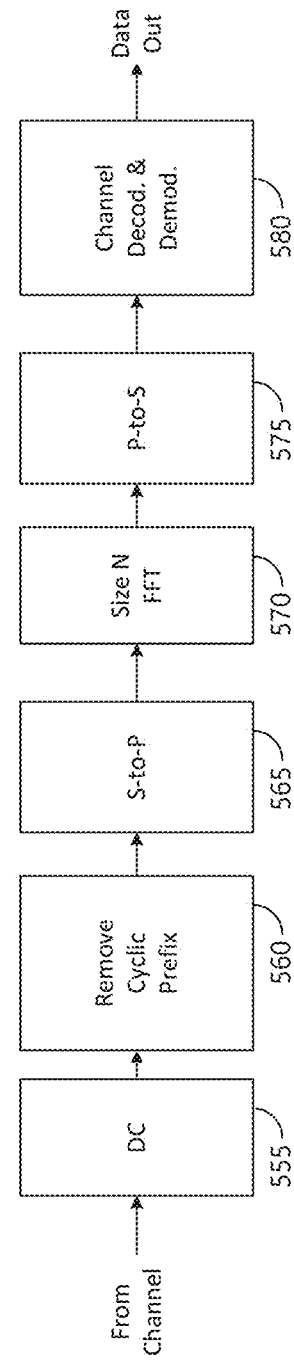

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support SIB based cell changes in NTN as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A non-terrestrial network (NTN) refers to a network, or segment of networks using RF resources on board a communication satellite (or unmanned aircraft system platform) (e.g., communication satellite(s) 104). Considering the capabilities of providing wide coverage and reliable service, an NTN is envisioned to ensure service availability and continuity ubiquitously. For instance, an NTN can support communication services in unserved areas that cannot be covered by conventional terrestrial networks, in underserved areas that are experiencing limited communication services, for devices and passengers on board moving platforms, and for future railway/maritime/aeronautical communications, etc.

In an NTN, the cells may be moving, leading to inaccuracy of the UE's perception of the platform's position and various types of propagation and processing delays in the system. The knowledge of various delays and prediction of the platform ephemeris data can be used for a more accurate estimation of timing adjustment (TA), leading to better pre-compensation at the UE.

Figure 6:
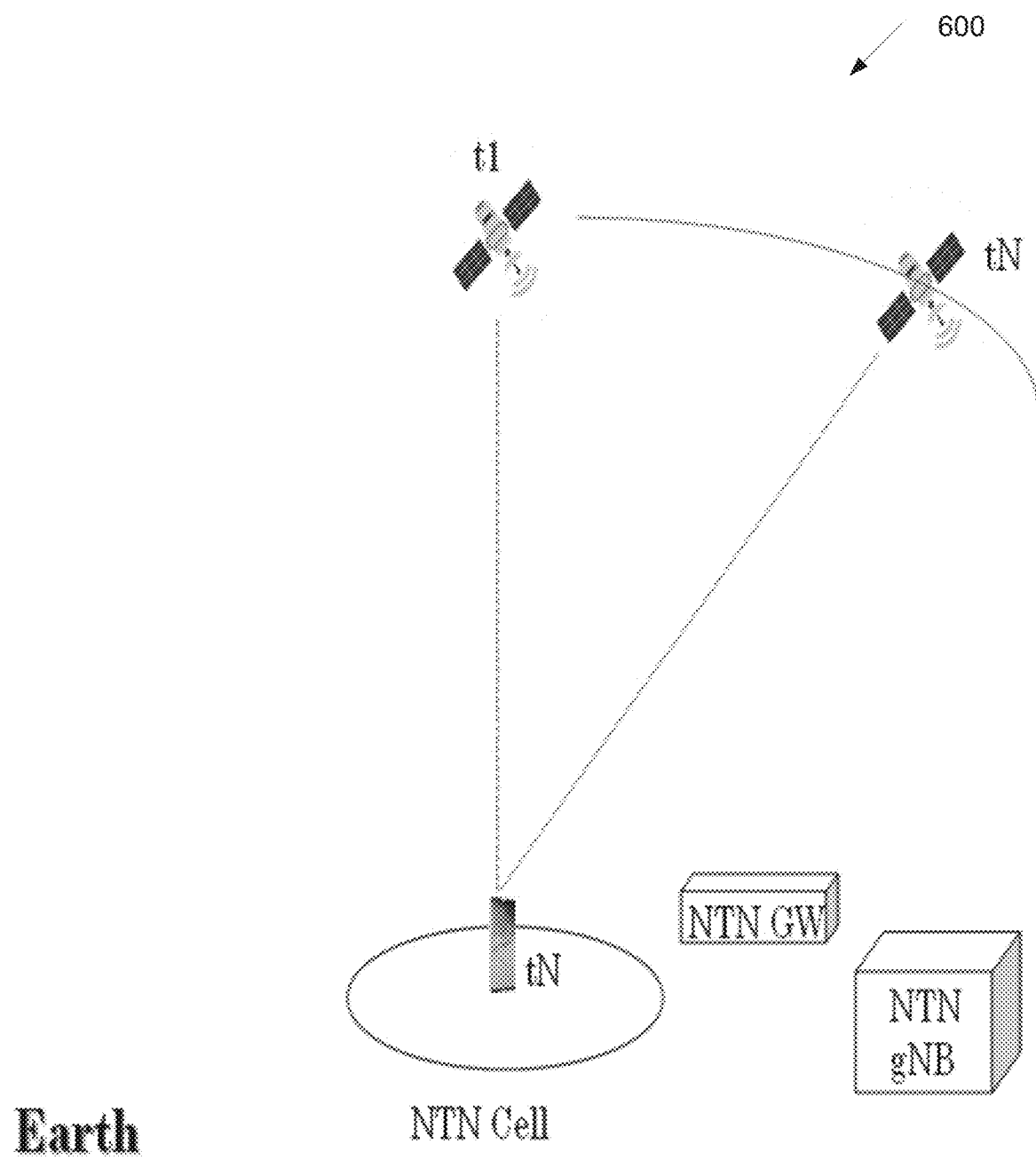
FIG. 6 illustrates an example of NTN configuration according to embodiments of the present disclosure.

FIG. 6 illustrates an example NTN configuration 600 according to an embodiment of the present disclosure. The embodiment of the example of NTN configuration 600 illustrated in FIG. 6 is for illustration only. FIG. 6 does not limit the scope of this disclosure to any particular implementation of the example of NTN configuration 600.

As illustrated in FIG. 6, specifically, the UE is attempting to estimate the UE's distance from the aerial/space-borne platform (e.g., a satellite) in NTN. Such distance estimate can then be used to do any timing pre-compensation at the UE. This knowledge can also be used to determine, report and use a suitable timing advance.

The aerial/space-borne platform acquires its own GNSS-based position at time t1. This information reaches a gNB via an NTN gateway. The gNB places the satellite's (potentially transformed position) in suitable system information (SI). The UE receives the satellites position at time tN and can now compare the satellite's position with the UE's own position at time tN. While FIG. 6 shows the aerial/space-borne platform moving from left to right, such platform may also be stationary with respect to a point on the earth's surface.

Figure 7:
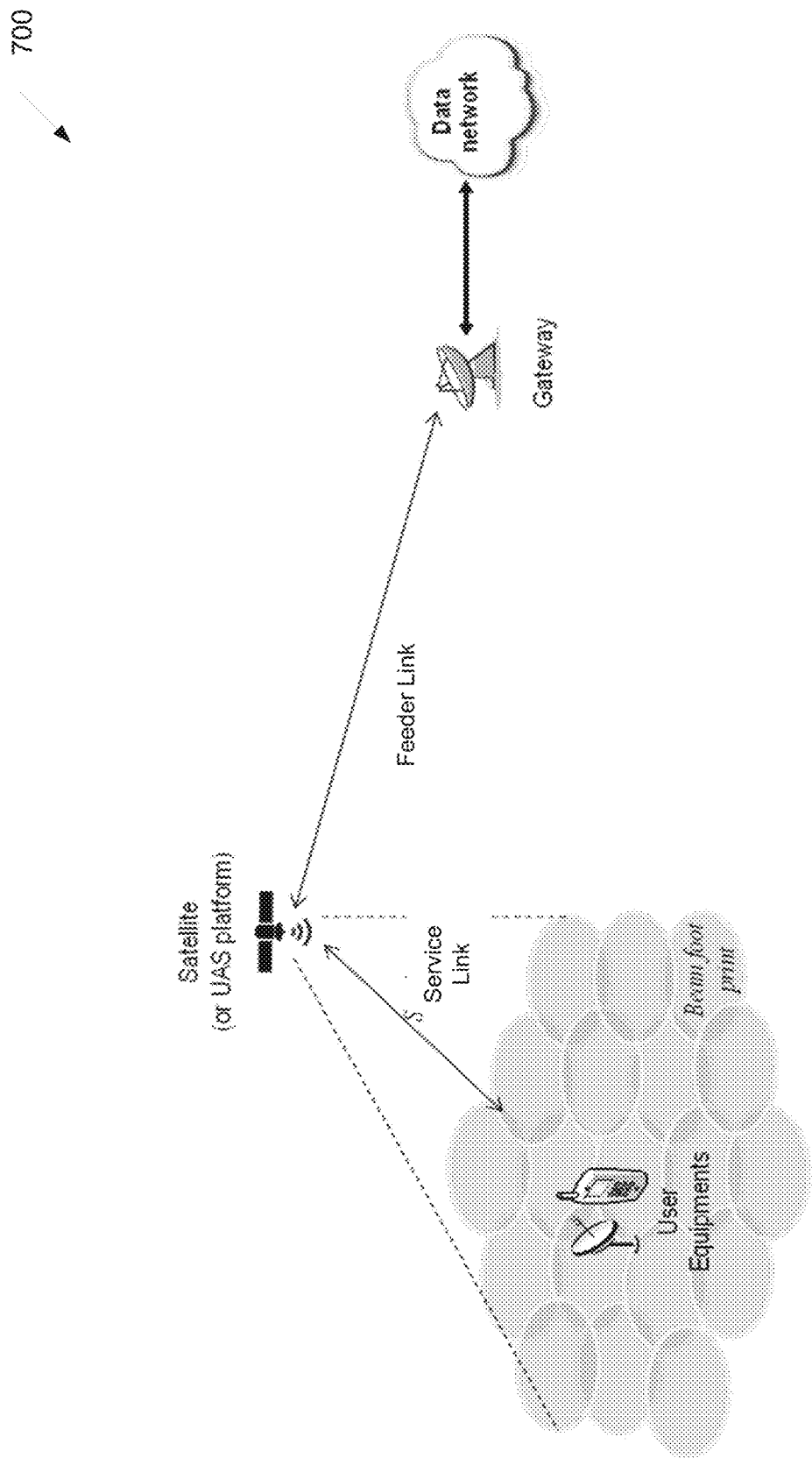
FIG. 7 illustrates an example of NTN communication.

FIG. 7 illustrates an example NTN communication network 700 according to embodiments of the present disclosure. For example, the NTN communication network 700 may be implemented in the network 700 in FIG. 7. An embodiment of the NTN communication network 700 shown in FIG. 7 is for illustration only.

The present disclosure is useful when long propagation delays exist such as those in am NTN. A brief description of an NTN is given below.

A traditional cellular network has all the necessary pieces of communications equipment on earth. Such network is often referred to as a terrestrial network (TN). In contrast, an NTN, as envisioned by 3GPP, makes use of some communications equipment that is located at a very high altitude above earth (e.g., more than tens of kilometers). FIG. 7 shows an example of an NTN that is using a space-borne vehicle such as a satellite or an air-borne vehicle such as an unmanned aircraft system or unmanned aerial system (UAS). An example of a UAS is a high altitude platform station (HAPS) such as a balloon or a special type of aircraft in stratosphere. The satellite could be geostationary earth orbiting (GEO), medium earth orbiting (MEO), or low earth orbiting (LEO), and highly elliptical orbiting (HEO).

The communication link between the NTN UE and the satellite is called the service link and the communication link between the NTN Gateway and the satellite is called the feeder link. Two satellites may communicate with each other using an inter satellite link (ISL). The satellite may carry a transparent payload or a regenerative payload for communications with the transceivers on earth.

A transparent payload implies that the communication equipment in the satellite is essentially an RF repeater. A transparent satellite payload receives an RF signal from a transmitter on earth, amplifies it, and transmits the amplified RF signal toward a receiver on earth. In case of a transparent payload, the gNB on earth sends/receives an NR RF signal to/from the NTN Gateway that is directly communicating with the satellite.

A regenerative payload involves some baseband processing on the satellite. For example, a full-fledged gNB may be on the satellite. In such case, the satellite and the NTN gateway implement the NG (i.e., N2 and N3) interfaces of the 5G network on the feeder link. In another implementation example, the gNB may be decomposed or disaggregated, where the satellite may implement gNB-DU (distributed unit) and the gNB-CU (central unit) would be on earth. The satellite and the NTN GW would then implement the F1 interface on the feeder link.

The 3GPP Release 16 has defined a mechanism that enables a UE to choose between a 4-Step random access (RA) procedure and a 2-Step RA procedure when both are configured for a UE in a TN. In the legacy 3GPP R16, the UE chooses 2-step RA when the measured reference signal received power (RSRP) in the serving cell exceeds the parameter "msgA-RSRP-Threshold." More specifically, msgA-RSRP-threshold is an RSRP threshold for selection between 2-step RA type and 4-step RA type when both 2-step and 4-step RA type random access resources are configured in the UL bandwidth part (BWP) for a given UE.

In an NTN, due to similar RSRPs in different parts of the cell, the RSRP-based RA type selection may not be reliable. Hence, a new method is needed. Hence, the current disclosure replaces such standalone threshold associated with the trigger quantity "RSRP" by a variety of triggers that utilize a standalone signal measurement quantity, a standalone non-signal measurement quantity, and a combination of two or more quantities from a set of signal measurement quantities and/or a set of non-signal measurement quantities.

In 3GPP wireless standards, NR has been discussed as 5G wireless communication technology. One of NR features under the discussion is an NTN. An NTN refers to a network, or segment of networks using RF resources on board a satellite (or unmanned aircraft system (UAS) platform) as shown in FIG. 7. NTN typically features the following elements: (1) one or several sat-gateways that connect the non-terrestrial network to a public data network; (2) a GEO satellite is fed by one or several sat-gateways which are deployed across the satellite targeted coverage (e.g., regional or even continental coverage). It may be assumed that a UE in a cell is served by only one sat-gateway; (3) a non-GEO satellite served successively by one or several sat-gateways at a time. The system ensures service and feeder link continuity between the successive serving sat-gateways with sufficient time duration to proceed with mobility anchoring and handover; (4) a feeder link or radio link between a sat-gateway and the satellite (or UAS platform); (5) a service link or radio link between the user equipment and the satellite (or UAS platform); (6) a satellite (or UAS platform) which may implement either a transparent or a regenerative (with on board processing) payload. The satellite (or UAS platform) typically generates several beams over a given service area bounded by the field of view. The footprints of the beams are typically of elliptic shape. The field of view of a satellite (or UAS platforms) depends on the on-board antenna diagram and min elevation angle; (7) a transparent payload: Radio Frequency filtering, Frequency conversion and amplification. Hence, the waveform signal repeated by the payload is un-changed; (8) a regenerative payload: Radio Frequency filtering, Frequency conversion and amplification as well as demodulation/decoding, switch and/or routing, coding/modulation. This is effectively equivalent to having all or part of base station functions (e.g., gNB) on board the satellite (or UAS platform); (9) inter-satellite links (ISL) optionally in case of a constellation of satellites. This may require regenerative payloads on board the satellites. ISL may operate in RF frequency or optical bands; and (10) UEs are served by the satellite (or UAS platform) within the targeted service area.

Figure 8:
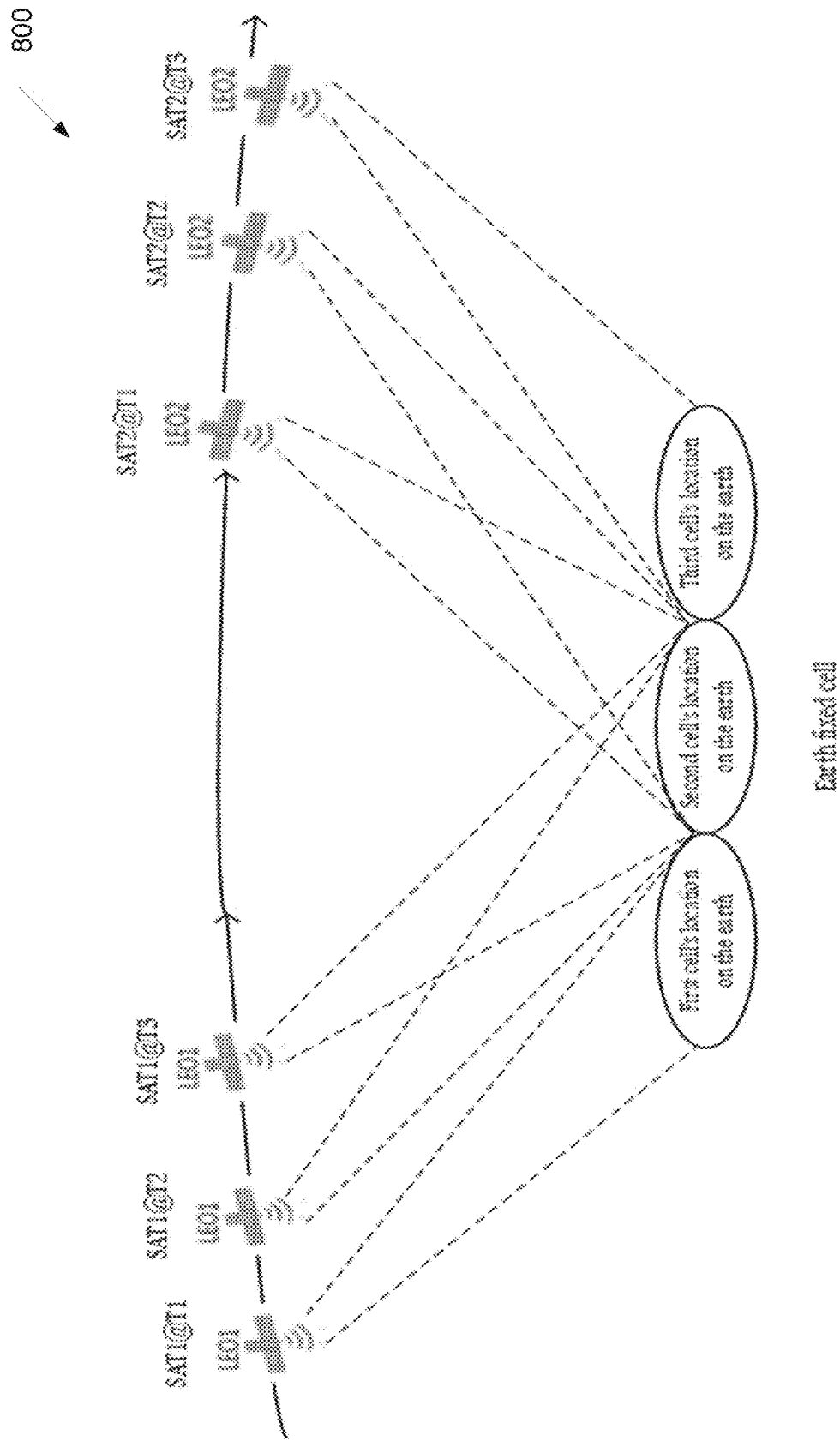
FIG. 8 illustrates an example of NTN cell according to embodiments of the present disclosure.

FIG. 8 illustrates an example of NTN cell 800 according to embodiments of the present disclosure. An embodiment of the NTN cell 800 shown in FIG. 8 is for illustration only.

FIG. 8 describes one example of how NTN provides cells fixed with respect to a certain location on the earth during a certain time duration. This can be achieved with NTN platforms generating steerable beams which footprint is fixed on the ground. Satellite 1 (SAT1) (here it is also called as LEO1 (Low-Earth Orbit 1) and satellite 2 (SAT2) (here it is also called as LEO2) are moving from the west to east direction. T1, T2 and T3 are certain consecutive time duration (e.g., T1 is between absolute time t1 to t2, T2 is between absolute time t2 to t3, and T3 is between absolute time t3 to t4).

During T1 duration, SAT1 provides NR service to the first cell's location on the earth and SAT2 provides NR service to the second cell's location on the earth. During T2 duration, both SAT1 and SAT2 provides NR service to the second cell's location on the earth. Note the physical cell ID (physical cell id is also called as PCI here) of the second cell's location on the earth by SAT1 and SAT2 can be different, which means the second cell's location on the earth is covered by two PCIs and each PCI and the associated NR service are provided by each satellite (e.g., SAT1 and SAT2).

Also note the frequency location of the SSB that includes cell's PCI information can be different between two cells in order to avoid strong interference in the case two cells are entirely overlapped. For instance, during T2 duration the second cell's location on the earth is served by PCI #N carried by SSB located in the carrier #1 by SAT1 while it is served by PCI #M carried by SSB located in the carrier #2 by SAT2. However, the PCI #M by SAT2 may be disappeared sooner or late since SAT2 may serve the third cell's location on the earth during the following T3 duration. At T3, if SAT2 switches serving location from the second cell's location to the third cell's location on the earth, all UEs located in the second cell's location on the earth that served by SAT2 may perform cell (re)selection to the cell served by SAT1.

Measurement rule is specified, as shown in TABLE 1 as specified in 3GPP standard specification, to save UE power consumption.

TABLE 1

5.2.4.2 Measurement rules for cell re-selection
Following rules are used by the UE to limit needed measurements:
- If the serving cell fulfils Srxlev > $S_{IntraSearchP}$ and Squal > $S_{IntraSearchQ}$, the UE may choose not to perform intra-frequency measurements.
- Otherwise, the UE may perform intra-frequency measurements.
- The UE may apply the following rules for NR inter-frequencies and inter-RAT frequencies which are indicated in system information and for which the UE has priority provided as defined in 5.2.4.1:
    - For a NR inter-frequency or inter-RAT frequency with a reselection priority higher than the reselection priority of the current NR frequency, the UE may perform measurements of higher priority NR inter-frequency or inter-RAT frequencies according to TS 38.133.
    - For a NR inter-frequency with an equal or lower reselection priority than the reselection priority of the current NR frequency and for inter-RAT frequency with lower reselection priority than the reselection priority of the current NR frequency:
        - If the serving cell fulfils Srxlev > $S_{nonIntraSearchP}$ and Squal > $S_{nonIntraSearchQ}$, the UE may choose not to perform measurements of NR inter-frequency cells of equal or lower priority, or inter-RAT frequency cells of lower priority;
        - Otherwise, the UE may perform measurements of NR inter-frequency cells of TABLE 1-continued equal or lower priority, or inter-RAT frequency cells of lower priority according to TS 38.133.
- If the UE supports relaxed measurement and relaxedMeasurement is present in SIB2, the UE may further relax the needed measurements, as specified in clause 5.2.4.9.

Note $S_{IntraSearchP}$, $S_{IntraSearchQ}$, $S_{nonIntraSearchP}$, $S_{nonIntraSearchQ}$, $S_{SearchDeltaP}$, $S_{SearchThresholdP}$, $S_{SearchThresholdQ}$ are threshold [dB] that are configured and broadcasted as system information by the gNB. Also note Srxlev and Squal is derived as follow.

Srxlev = $Q_{rxlevmeas}$ − ($Q_{rxlevmin}$ + $Q_{rxlevminoffset}$) − $P_{compensation}$ − $Qoffset_{temp}$, Squal = $Q_{qualmeas}$ − ($Q_{qualmin}$ + $Q_{qualminoffset}$) − $Qoffset_{temp}$ In TABLE 1, some parameters are shown in TABLE 2.

| | |
|---|---|
| Srxlev | Cell selection RX level value (dB) |
| Squal | Cell selection quality value (dB) |
| $Qoffset_{temp}$ | Offset temporarily applied to a cell as specified in TS 38.331 (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, $Q_{rxlevmin}$ is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else $Q_{rxlevmin}$ is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is Signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN, as specified in TS 23.122. |
| $Q_{qualminoffset}$ | Offset to the signalled $Q_{qualmin}$ taken into account in the Squal evaluation as a result of a periodic search for a higher priority PLMN while camped normally in a VPLMN, as specified in TS 23.122. |
| $P_{compensation}$ | For FR1, if the UE supports the additionalPmax in the NR-NS-PmaxList, if present, in SIB1, SIB2 and SIB4: max($P_{EMAX1}$ − $P_{PowerClass}$, 0) − (min($P_{EMAX2}$, $P_{PowerClass}$) − min($P_{EMAX1}$, $P_{PowerClass}$)) (dB); else: max($P_{EMAX1}$ − $P_{PowerClass}$, 0) (dB) For FR2, $P_{compensation}$ is set to 0. |
| $P_{EMAX1}$, $P_{EMAX2}$ | Maximum TX power level of a UE may use when transmitting on the uplink in the cell (dBm) defined as $P_{EMAX}$ in TS 38.101. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331 [3], else $P_{EMAX1}$ and $P_{EMAX2}$ are obtained from the p-Max and NR-NS-PmaxList respectively in SIB1, SIB2 and SIB4 |
| $P_{PowerClass}$ | for normal UL as specified in TS 38.33. Maximum RF output power of the UE (dBm) according to the UE power class as defined in TS 38.101. |

The signaled values $Q_{rxlevminoffset}$ and $Q_{qualminoffset}$ are only applied when a cell is evaluated for cell selection as a result of a periodic search for a higher priority PLMN while camped normally in a VPLMN (TS 23.122). During this periodic search for higher priority PLMN, the UE may check the S criteria of a cell using parameter values stored from a different cell of this higher priority PLMN.

The above current measurement rule does not work well in NTN scenario in FIG. 8. It may be assumed that the UE is in the serving cell with PCI #M carried by SSB located in the carrier #2 by SAT2 at T1 and the UE probably needs to measure incoming neighboring cell with PCI #N carried by SSB located in the carrier #1 by SAT1 at T1 or T2, however according to the current measurement rule, the UE may not measure the cell with PCI #N by SAT1 if the serving cell's Srxlev and/or Squal does not go below $S_{nonIntraSearchP}$ and/or $S_{nonIntrasearchQ}$. Note the incoming cell with PCI #N carried by SSB located in the carrier #1 by SAT1 is considered as inter-frequency neighboring cells measurement since the SSB is located in the different frequency compared to the one of the current serving cell.

Figure 9:
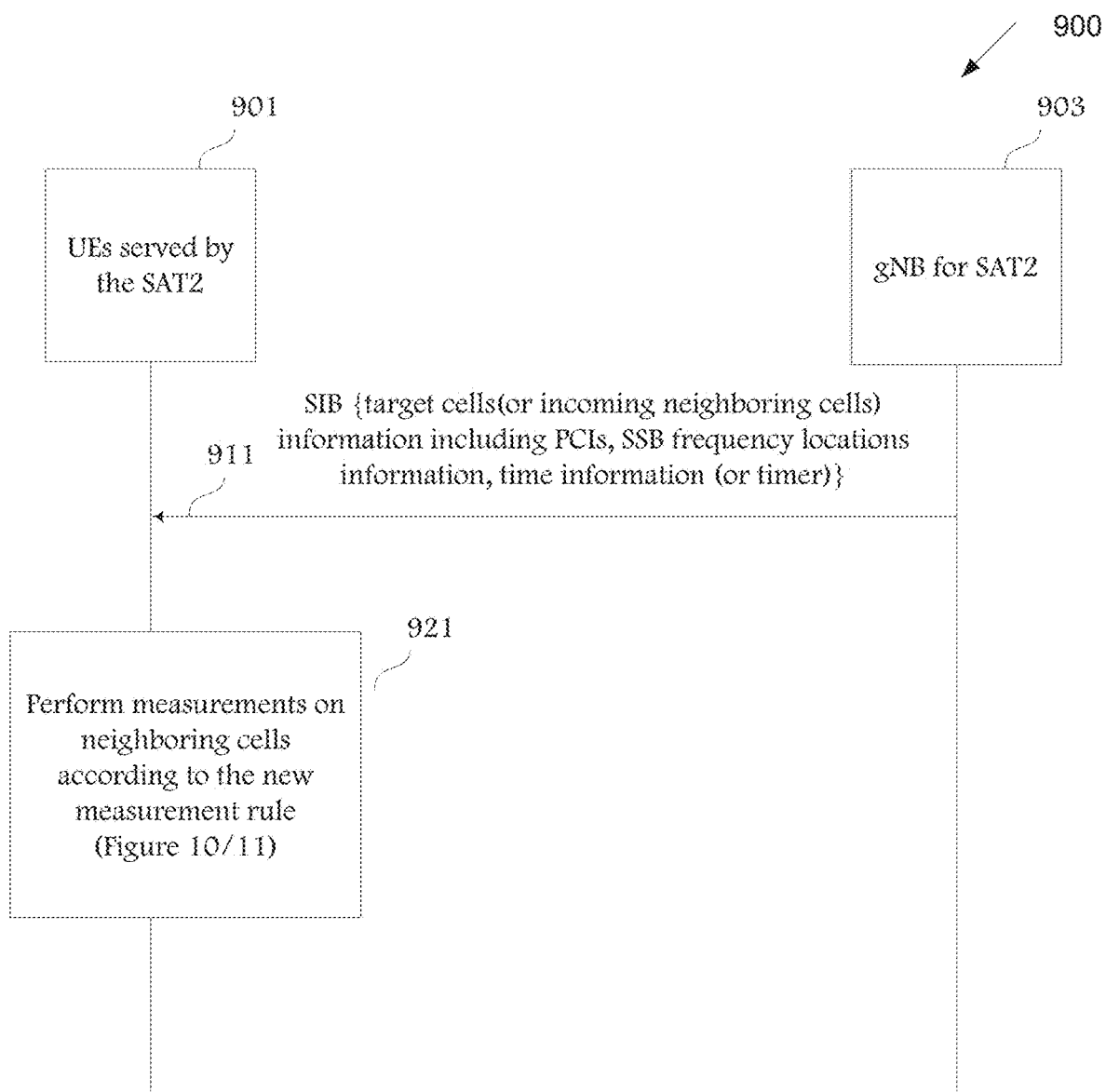
FIG. 9 illustrates a signaling flow between a UE and a gNB according to embodiments of the present disclosure.

FIG. 9 illustrates a signaling flow 900 between a UE and a gNB according to embodiments of the present disclosure. For example, the signaling flow 900 as may be performed by a UE (e.g., 111-116 as illustrated in FIG. 1) and a BS (e.g., 101-103 as illustrated in FIG. 1). An embodiment of the signaling flow 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 describes an example of signaling flows for one embodiment. It may be assumed that the UEs are currently served in the cell provided by the gNB for SAT2 (e.g., step 901 and step 903). The gNB configures and transmits the target cells (or incoming neighboring cells) information by SIB or UE dedicated RRC message (e.g., RRC connection reconfiguration message) (e.g., step 911). If SIB is used, the information can be included in a new SIB, which is introduced for NTN specific purpose, or the information can be also included in the existing SIB, for instance SIB3 which contains neighboring cell related information relevant only for intra-frequency cell re-selection. Target cells (or incoming neighboring cells) information includes the cells' PCI information, the cells' corresponding SSB frequency location information, and time (or timer) information.

PCI information indicates the cell's PCI ID. SSB frequency location information indicates the cell's frequency location where the SSB is transmitted. SSB frequency location information can be indicated by absolute radio frequency channel number (ARFCN) value or frequency offset compared to the serving cell's ARFCN. Time information indicates the timing information when the UE needs to consider the indicated target cells (or incoming neighboring cells) in the measurements.

Timing information can be indicated by absolute timing values that indicate the starting time and/or terminating time. As alternative timing information can be indicated by system frame number (SFN) that indicate the starting SFN and/or terminating SFN. As another alternative, a timer can be configured. If a timer is configured, the UE needs to consider the indicated target cells (or incoming neighboring cells) in the measurement from the start of the timer (e.g., timer is started upon the reception of step 911) to the expiry of the timer. Once the UE receives in step 921, the UE performs measurements on neighboring cells according to the new measurement rule, which is provided in the following FIG. 10 or FIG. 11.

Figure 10:
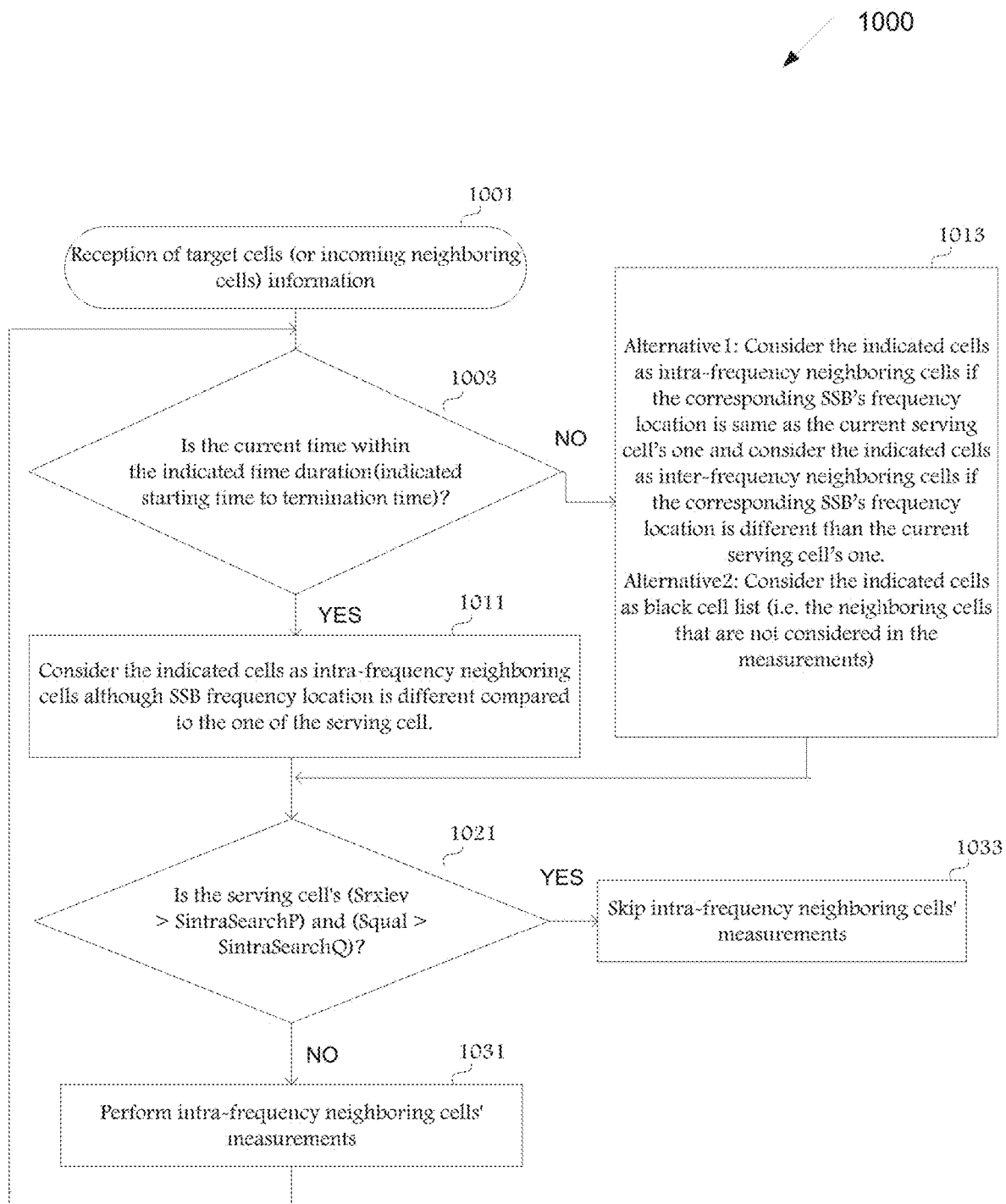
FIG. 10 illustrates a flowchart of a method for a measurement according to embodiments of the present disclosure.

FIG. 10 illustrates a flowchart of a method 1000 for a measurement according to embodiments of the present disclosure. For example, the method 1000 as may be performed by a UE (e.g., 111-116 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

FIG. 10 describes an example of the embodiments for the UE behaviors to the new measurement rule. The UE receives the configuration of target cells (or incoming neighboring cells) information including PCIs, SSB frequency location, and the stating time and termination time (or timer) information from the gNB (in step 1001). The information can be received by either SIB or UE dedicated RRC message, e.g., RRC connection reconfiguration message. Once the UE receives the information, the UE checks if the current time is within the indicated time duration (step 1003).

It may be assumed that the indicated time duration is T1 as the starting time and T2 as terminating time. If the current time is located in T1 to T2, the UE considers the indicated cells as intra-frequency neighboring cells although SSB frequency location is different compared to the one of the current serving cell (step 1011). If the current time is not located in T1 to T2, as one alternative, the UE considers the indicated cells as intra-frequency neighboring cells if the corresponding SSB's frequency location is same as the current serving cell's SSB's frequency location and considers the indicated cells as inter-frequency neighboring cells if the corresponding SSB's frequency location is different than the current serving cell's SSB frequency location (step 1013).

As another alternative, the UE considers the indicated cells as black cell list, which means the indicated cells are not considered in the neighboring cell measurements, i.e., the indicated cells do not need to be measured (step 1013). Then the UE checks if the current serving cell's Srxlev and Squal meets the condition, i.e., (Srxlev>SintraSearchP) and (Squal>SintraSearchQ) (step 1021). If it is met, the UE skips performing intra-frequency neighboring cells' measurements (step 1033). If it is not met, the UE performs intra-frequency neighboring cells' measurements (step 1031). The UE continue checking if the current time is within the indicated time duration.

Figure 11:
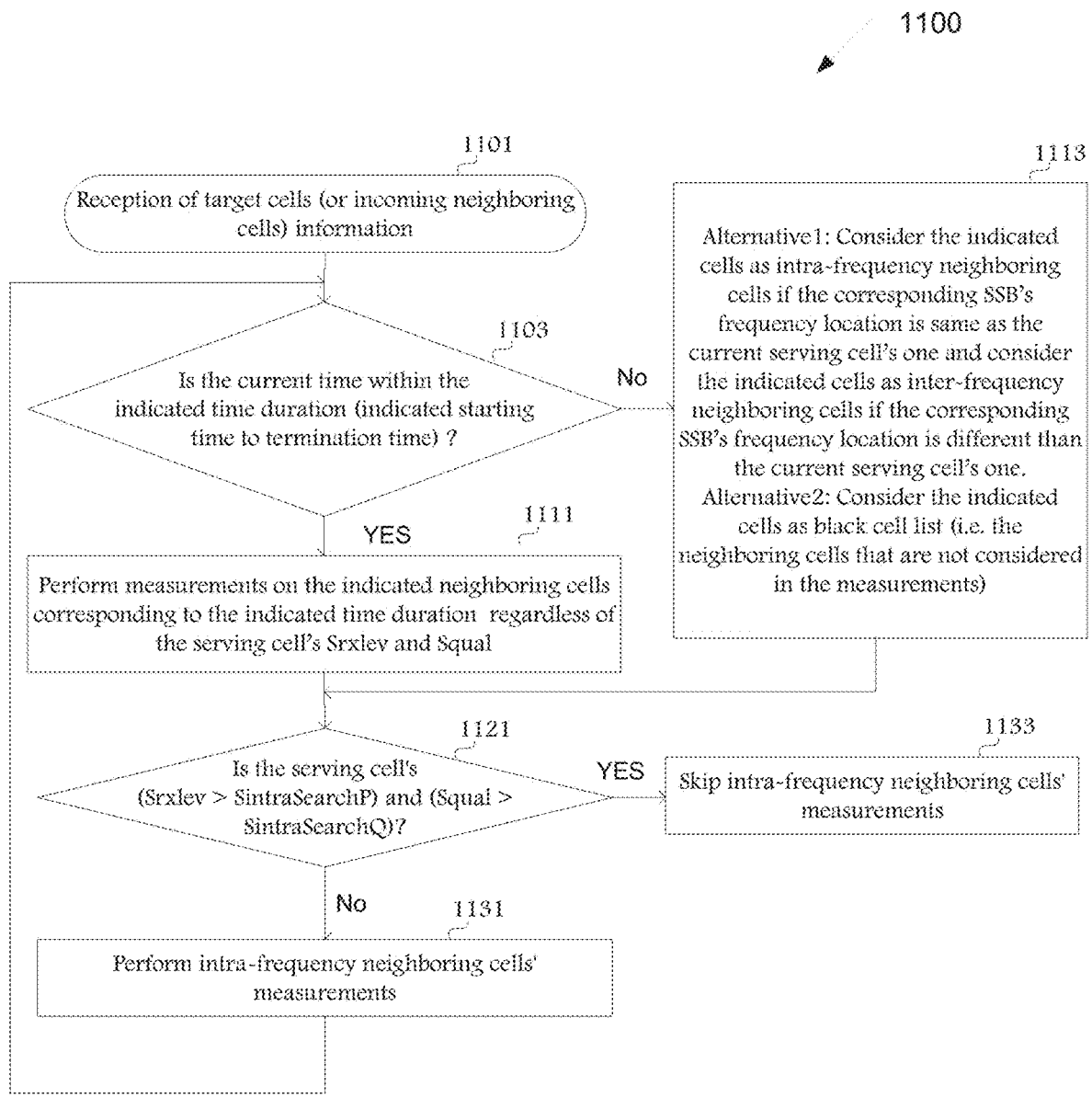
FIG. 11 illustrates another flowchart of a method for a measurement according to embodiments of the present disclosure.

FIG. 11 illustrates another flowchart of a method 1100 for a measurement according to embodiments of the present disclosure. For example, the method 1100 as may be performed by a UE (e.g., 111-116 as illustrated in FIG. 1). An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

FIG. 11 describes another example of the embodiments for the UE behaviors to the new measurement rule. The UE receives the configuration of target cells (or incoming neighboring cells) information including PCIs, SSB frequency location, and the stating time and termination time (or timer) information from the gNB (step 1101). The information can be received by either SIB or UE dedicated RRC message, e.g., RRC connection reconfiguration message. Once the UE receives the information, the UE checks if the current time is within the indicated time duration (step 1103).

It may be assumed that the indicated time duration is T1 as the starting time and T2 as terminating time. If the current time is located in T1 to T2, the UE performs measurements on the indicated neighboring cells corresponding to the indicated time duration regardless of the current serving cell's Srxlev and Squal (step 1111). If the current time is not located in T1 to T2, as one alternative, the UE considers the indicated cells as intra-frequency neighboring cells if the corresponding SSB's frequency location is same as the current serving cell's SSB's frequency location and considers the indicated cells as inter-frequency neighboring cells if the corresponding SSB's frequency location is different than the current serving cell's SSB frequency location (step 1113).

As another alternative, the UE considers the indicated cells as black cell list, which means the indicated cells are not considered in the neighboring cell measurements, i.e., the indicated cells do not need to be measured (step 1113). Then the UE checks if the current serving cell's Srxlev and Squal meets the condition, i.e., (Srxlev>SintraSearchP) and (Squal>SintraSearchQ) (step 1121). If it is met, the UE skips performing intra-frequency neighboring cells' measurements (step 1133). If it is not met, the UE performs intra-frequency neighboring cells' measurements (step 1131). The UE continue checking if the current time is within the indicated time duration.

Figure 12:
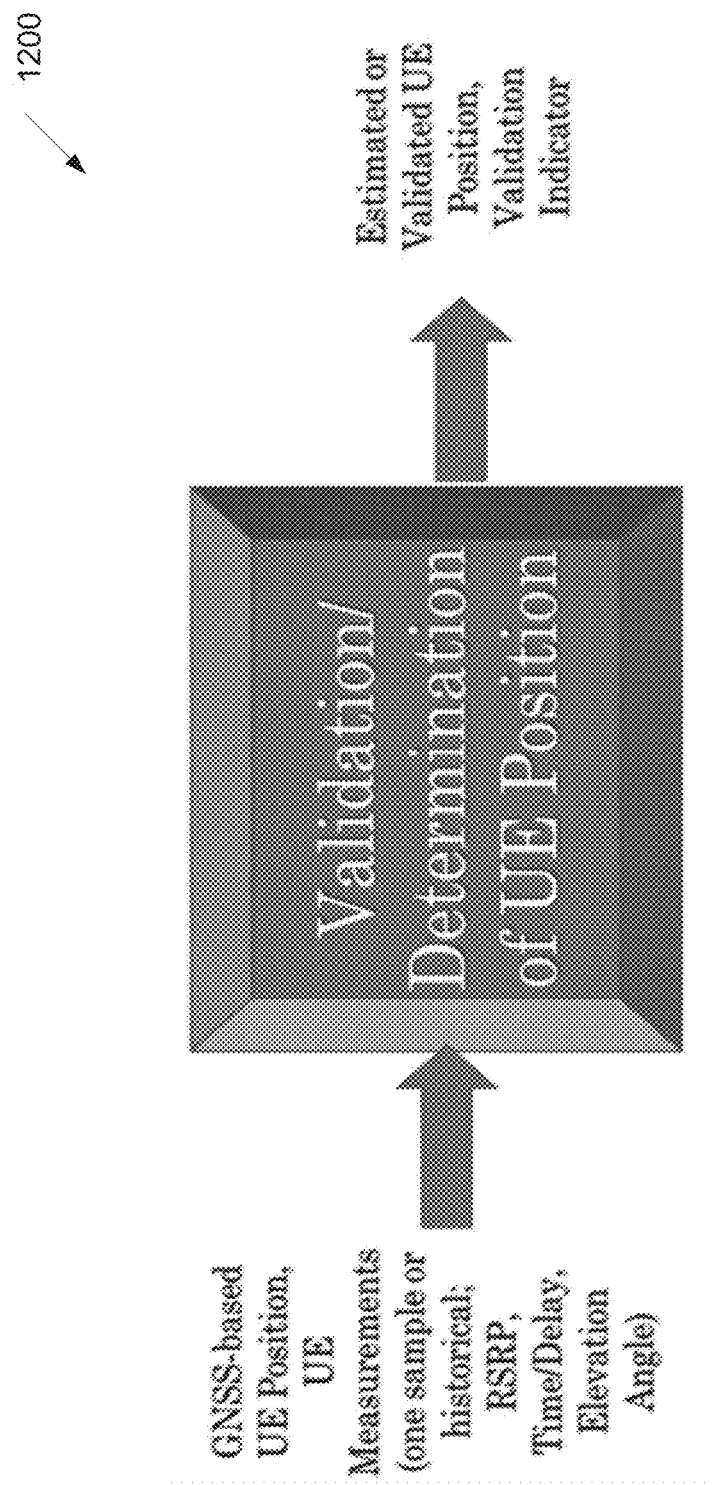
FIG. 12 illustrates an example of mechanism of validation and estimation of the UE position according to embodiments of the present disclosure.

FIG. 12 illustrates an example of mechanism of validation and estimation of the UE position 1200 according to embodiments of the present disclosure. An embodiment of the mechanism of validation and estimation of the UE position 1200 shown in FIG. 12 is for illustration only.

AS illustrated in FIG. 12, the UE provides to a network function (NF) the UE's GNSS-based position along with historical measurements (e.g., most recent 3 measurements) for multiple quantities (e.g., one-way propagation delay (OPD), RSRP, elevation angle (EA)). If the UE does not have a GNSS capability, the UE may still send other quantities. Furthermore, if the UE has its past location but does not have the current location (e.g., due to poor GNSS visibility), the UE sends such location with the associated timestamp. A suitable NF such as the gNB, the access and mobility management function (AMF), or the location management function (LMF) utilizes the received measurements and validates the UE-reported position or estimates the UE position based on reported measurements.

Figure 13:
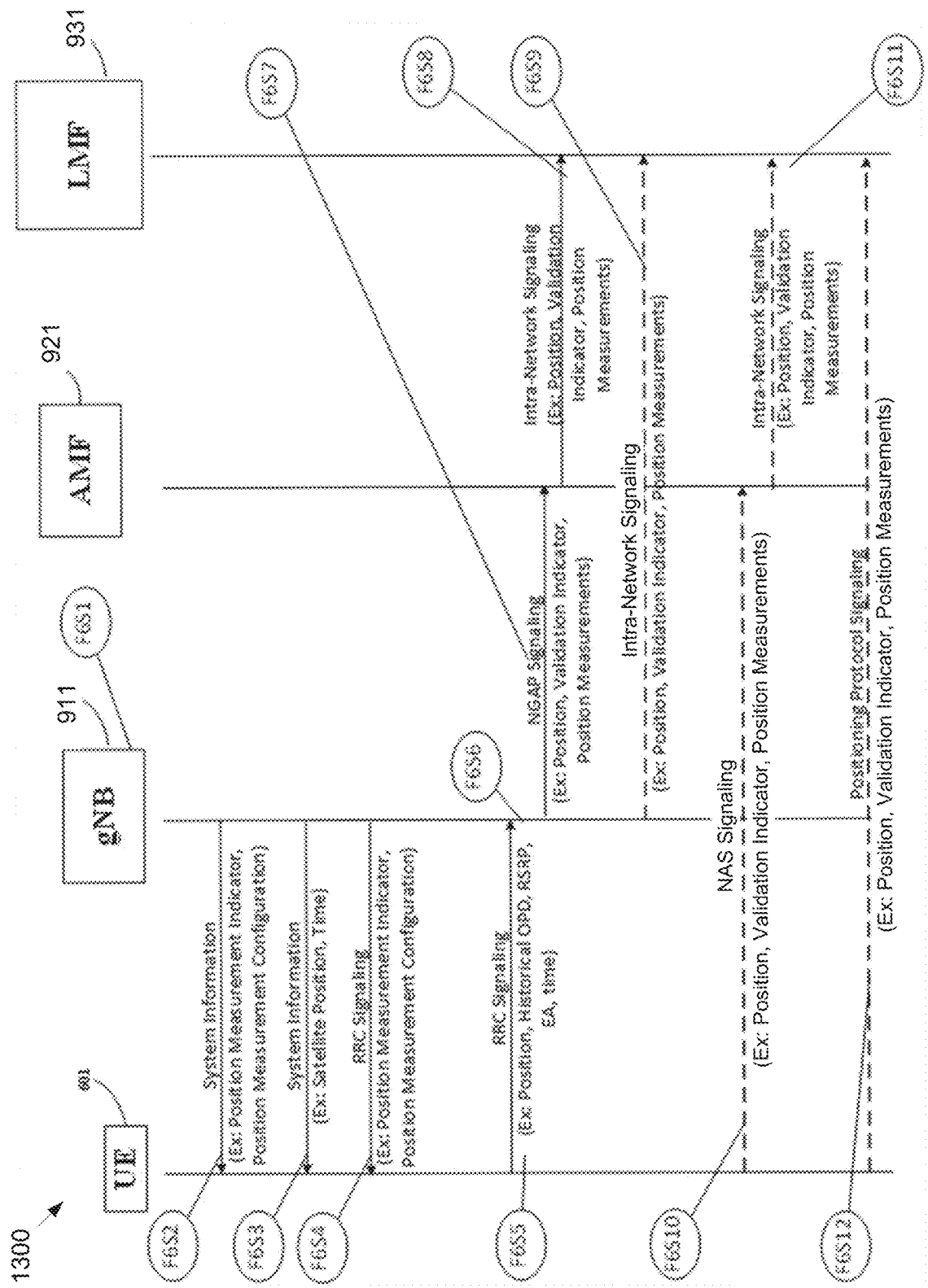
FIG. 13 illustrates a signaling flow of a UE-network procedure for validation and estimation of the UE position according to embodiments of the present disclosure.

FIG. 13 illustrates a signaling flow of a UE-network procedure 1300 for validation and estimation of the UE position according to embodiments of the present disclosure. For example, the UE-network procedure 1300 as may be performed by a BS (e.g., 101-103 as illustrated in FIG. 1) and a UE (e.g., 111-116 as illustrated in FIG. 1). An embodiment of the UE-network procedure 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

AS illustrated in FIG. 13, in step F6S1, in an example approach, the gNB receives configuration about the UE position validation. A network function such as OAM, application server, AMF, or LMF may provide such configuration to the gNB. The gNB may also be configured locally with such configuration. Such configuration reflects the target use cases for the location services (LCS) such as distinguishing country borders and emergency calls or sessions.

In step F6S2, in an example embodiment, the gNB broadcasts the indication about the need for position validation measurements (e.g., "PositionValidationMeasurementIndicator") so that the UEs in the cell know if the UEs need to make and store measurements. For a given quantity, the measurement could be one sample or a set of measurements (i.e., "historical measurements").

In another approach, the need for the position validation measurements may be implicitly conveyed by the presence of suitable information element (IE) such as the configuration for such validation measurements.

In yet another approach, in step F6S2, the need for the validation measurements may be based on a rule defined in specifications. As an example of such rule, in case of the emergence call use case, the selection of the voice application by the user or dialing of an emergency number (at the application layer) triggers the UE to make positioning related validation measurements.

The gNB, in an example implementation in step F6S2, specifies periodicity of measurements (e.g., every X ms or seconds) and the number of samples ("numHistoricalMeasurements") that the UE may store for a given measurement quantity or all measurement quantities.

The gNB, in an example embodiment in step F6S2, specifies multiple quantities that the UE may record in addition to the UE position. Examples of such quantities include RSRP of the serving cell and applicable neighbor cells, one-way propagation delay (OPD) between the UE and the platform, and elevation angle toward the serving cell. In another approach, the round trip propagation delay between the UE and the platform or between the UE and the gNB can be used although the OPD is a more direct indication of the distance between the UE and the platform (e.g., a satellite).

The gNB, in an example implementation in step F6S2, specifies an RSRP threshold for the reporting of neighbor cells ("Thresh_RSRP_NeighborSearch_PositionValidation). If a neighbor cell exceeds such threshold, it is reported by the UE in steps F6S5, F6S10, or F6S12.

In an example approach in step F6S2, a set of all the neighbor cells of the serving cell is specified in a SIB, where such set can be different from the typical neighbor list used for cell reselection and handover.

In yet another approach in step F6S2, the RSRP threshold is not explicitly specified, and the UE reports RSRPS of any neighbor cell that is detected.

In step F6S3, the gNB broadcasts the platform's position and time associated with such position. In one approach, this time may be (i) the instant at which the platform had determined its position, (ii) the instant at which the gNB has created a SIB carrying such position, or (iii) the instant at which a suitable location in the cell (e.g., center of the cell) would receive the relevant SIB.

In an example implementation, to enable the UE to decouple the determination of the OPD from the UE's own GNSS-based position, the gNB includes in a SIB a distinct piece of information that specifies the instant at which the platform is expected to broadcast such SIB. The UE can then compare its own current time with the time in the SIB to estimate the OPD. In another approach, the UE calculates the OPD based on the UE's GNSS-based position and the platform's position.

In step F6S4, depending on the gNB implementation, the gNB may choose to convey the information specified in step F6S2 to the UE via dedicated RRC signaling such as in an RRC Reconfiguration message. In such case, such information can be UE-specific and overwrites the broadcast information. Such RRC signaling may be sent via unicast signaling or groupcast/multicast signaling.

In step F6S5, in an example embodiment, when the position and position measurement reporting criterion is met, the UE provides to the gNB via RRC signaling (e.g., in a measurement report message) the UE's GNSS-based position (if available) and position validation measurements and measurement times based on the configuration received from the gNB in steps F6S2 and/or step F6S4. If the UE is not capable of GNSS, the UE position can be absent in the message. If the UE does not have the latest GNSS position (e.g., due to poor visibility or lack of visibility of GNSS), the UE reports its last-known GNSS-based position and associated time.

In step F6S6, in an example implementation, the gNB utilizes the reported validation measurements and other information (e.g., distribution of RSRPs, delays, and EAs in the cell) to validate the UE-reported position. If the UE has not specified its current GNSS-based position, the gNB may estimate the UE's GNSS-based position.

In step F6S7, in an example implementation, the gNB conveys the validated UE position or estimated UE position to the AMF. The gNB may include a validation indicator indicating if the gNB has validated the UE position or not. A suitable confidence or accuracy probability may also be included by the gNB. In another approach, to facilitate validation of the UE position by another NF (e.g., AMF or LMF), the gNB may provide received position validation measurements to the AMF.

In step F6S8, in an example implementation, if the AMF is responsible to validate or estimate the UE position, the AMF carries out such processing. If the AMF is not responsible for such processing, the AMF forwards the information received from the gNB to the LMF. The AMF may include a validation indicator created by itself or the gNB to indicate that the UE's position has been validated or not. A suitable confidence or accuracy probability may also be included by the AMF (from the gNB or calculated by the AMF if the AMF has carried out the validation/estimation).

In step F6S9, in an example implementation, the information about the UE position and associated measurements may be conveyed to the LMF by the gNB directly. The gNB can, in another approach, still execute step F6S7 to inform the AMF about the UE position. The LMF may decide to convey the UE position (validated or estimated) to the AMF/gNB per implementation.

In step F6S10, in support of the UE position validation/estimation by the AMF or the LMF, the UE specifies the relevant information to the AMF, and the AMF conveys the validated/estimated UE position (along with position measurements if needed) to the LMF in step F6S11.

In step F6S12, in support of the UE position validation/estimation by the LMF, the UE specifies its position (if available) and position measurements to the LMF. The LMF carries out validation or estimation and informs the AMF/gNB about the UE position as needed.

Figure 14:
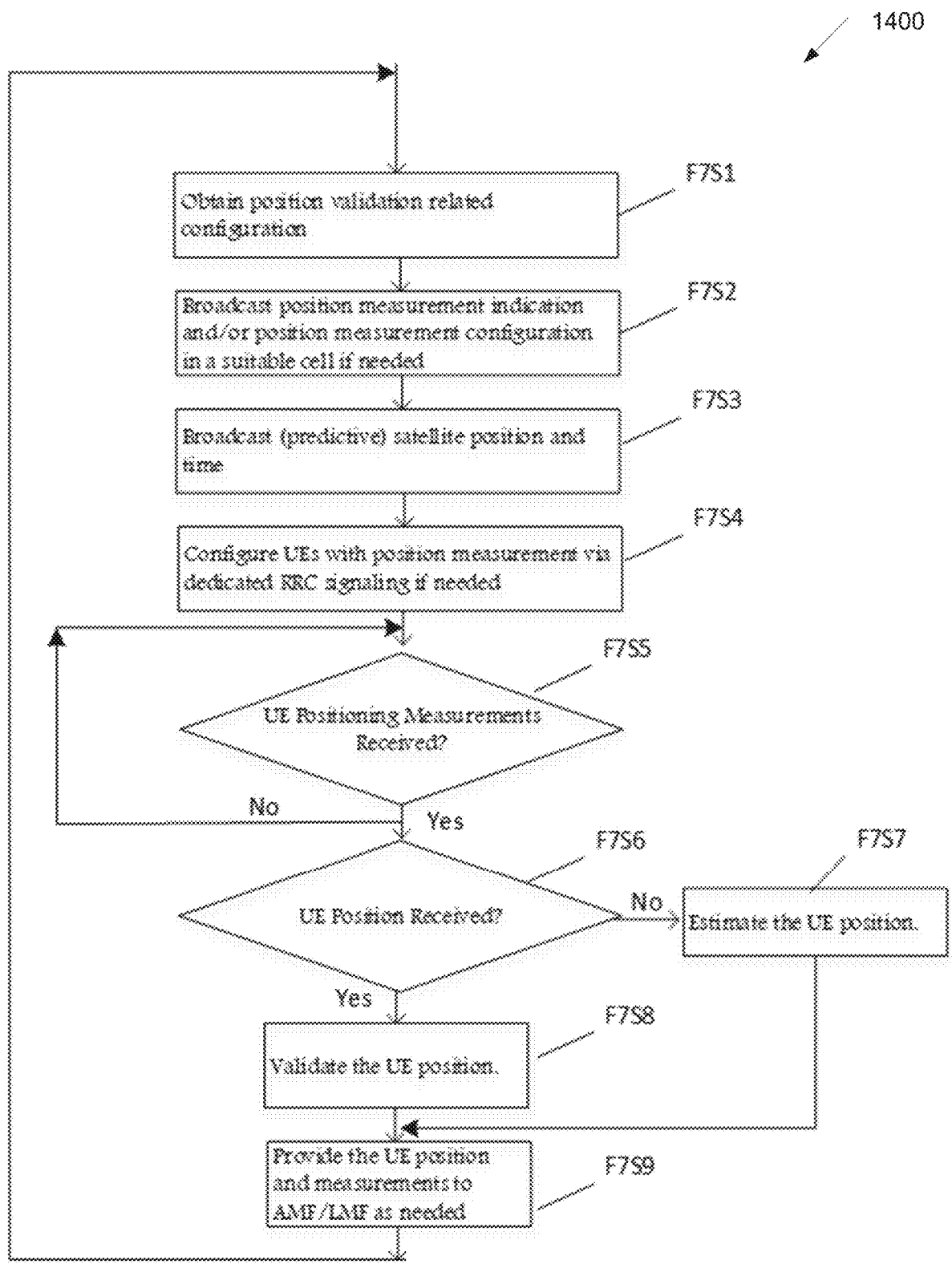
FIG. 14 illustrates a flowchart of a method for UE position validation and estimation according to embodiments of the present disclosure.

FIG. 14 illustrates a flowchart of a method 1400 for UE position validation and estimation according to embodiments of the present disclosure. For example, the method 1400 as may be performed by a BS (e.g., 101-103 as illustrated in FIG. 1). An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, in step F7S1, in an example approach, the gNB receives configuration about the UE position validation. A network function such as OAM, application server, AMF, or LMF may provide such configuration to the gNB. The gNB may also be configured locally with such configuration. Such configuration reflects the target use cases for the location services (LCS) such as distinguishing country borders and emergency calls or sessions.

In step F7S2, in an example embodiment, the gNB broadcasts the indication about the need for position validation measurements (e.g., "PositionValidationMeasurementIndicator") so that the UEs in the cell know if the UEs need to make and store measurements. For a given quantity, the measurement could be one sample or a set of measurements (i.e., "historical measurements").

In another approach, the need for the position validation measurements may be implicitly conveyed by the presence of suitable information element (IE) such as the configuration for such validation measurements. In yet another approach, as mentioned in step F6S2, the need for the validation measurements may be based on a rule defined in specifications.

The gNB, in an example implementation in step F7S2, specifies periodicity of measurements (e.g., every X ms or seconds) and the number of samples ("numHistoricalMeasurements") that the UE may store for a given measurement quantity or all measurement quantities.

The gNB, in an example embodiment in step F7S2, specifies multiple quantities that the UE may record in addition to the UE position. Examples of such quantities include RSRP of the serving cell and applicable neighbor cells, one-way propagation delay (OPD) between the UE and the platform, and elevation angle toward the serving cell. In another approach, the round trip propagation delay between the UE and the platform or between the UE and the gNB can be used although the OPD is a more direct indication of the distance between the UE and the platform (e.g., a satellite).

The gNB, in an example implementation in step F7S2, specifies an RSRP threshold for the reporting of neighbor cells ("Thresh_RSRP_NeighborSearch_PositionValidation").

If a neighbor cell exceeds such threshold, it is reported by the UE in steps F6S5, F6S10, or F6S12.

In an example approach in step F7S2, the gNB may specify a set of all the neighbor cells of the serving cell is specified in a SIB, where such set can be different from the typical neighbor list used for cell reselection and handover.

In yet another approach in step F7S2, the gNB may not broadcast the RSRP threshold, requiring the UE to report RSRPS of any neighbor cell that is detected per specifications.

In step F7S3, the gNB broadcasts the platform's position and time associated with such position. In one approach, this time may be: (i) the instant at which the platform had determined the UE's position, (ii) the instant at which the gNB has created a SIB carrying such position, or (iii) the instant at which a suitable location in the cell (e.g., center of the cell) would receive the relevant SIB.

In an example implementation, to enable the UE to decouple the determination of the OPD from the UE's own GNSS-based position, the gNB includes in a SIB a distinct piece of information that specifies the instant at which the platform is expected to broadcast such SIB. The UE can then compare its own current time with the time in the SIB to estimate the OPD. In another approach, the UE calculates the OPD based on its GNSS-based position and the platform's position.

In step F7S4, the gNB may choose to convey the information specified in step F7S2 to the UE via dedicated RRC signaling such as in an RRC Reconfiguration message. In such case, such information can be UE-specific and overwrites the broadcast information. Such RRC signaling may be sent via unicast signaling or groupcast/multicast signaling.

In step F7S5, in an example embodiment, the gNB checks if it has received the position measurements from the UE or not. If not, the gNB keeps checking for such report. If yes, the gNB executes step F7S6.

In step F7S6, in an example embodiment, the gNB checks if it has received the position from the UE or not. If not, the gNB executes step F7S7. Otherwise, the gNB executes step F7S8.

In step F7S7, in an example embodiment, the gNB checks if it has received the position from the UE or not. If not, the gNB utilizes the reported validation measurements and other information (e.g., distribution of RSRPs, delays, and EAs in the cell) to estimate the UE position. The gNB then goes to step F7S9.

In step F7S8, in an example embodiment, the gNB utilizes the reported validation measurements and other information (e.g., distribution of RSRPs, delays, and EAs in the cell) to validate the UE position. The gNB then goes to step F7S9.

In step F7S9, in an example implementation, the gNB conveys the validated UE position or estimated UE position to the AMF or the LMF.

While FIG. 14 shows the gNB validating and estimating the UE position, another network entity such as the AMF can do validation and estimation in another embodiment of the present disclosure.

In yet another embodiment of the present disclosure, the LMF performs validation and estimation.

Figure 15:
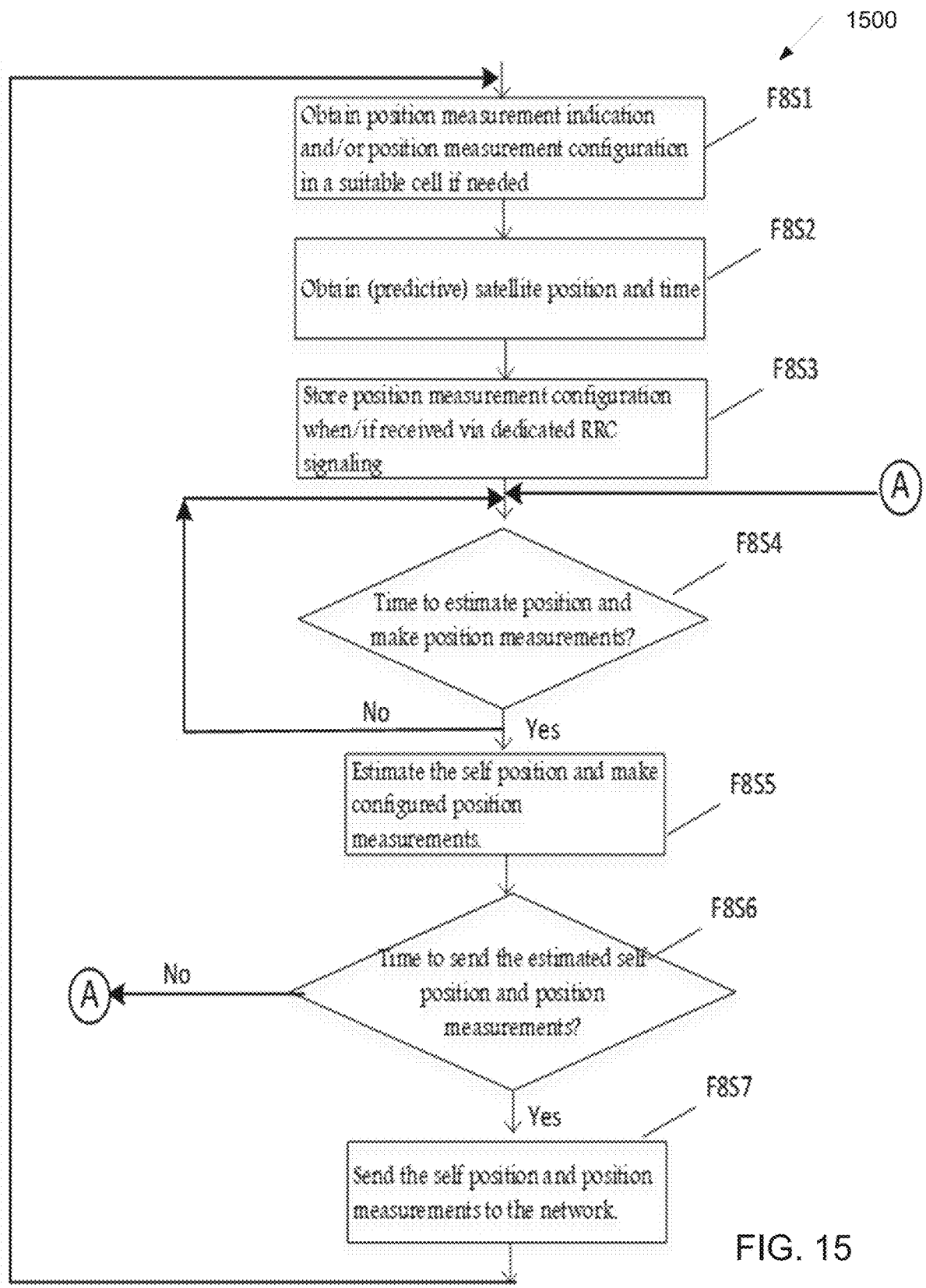
FIG. 15 illustrates a flowchart of a method for ephemeris and TA management according to embodiments of the present disclosure.

FIG. 15 illustrates a flowchart of a method 1500 for ephemeris and TA management according to embodiments of the present disclosure. For example, the method 1500 as may be performed by a UE (e.g., 111-116 as illustrated in FIG. 1). An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

In step F8S1, the UE receives from a SIB the indication about the need for position validation measurements (e.g., "PositionValidationMeasurementIndicator") so that the UE knows if the UE needs to make and store measurements to support position validation in the network. As mentioned in step F7S2, the need for the position validation measurements may be implicit. The UE records the periodicity of measurements (e.g., every X ms or seconds) and the number of samples ("numHistoricalMeasurements") for a given measurement quantity or all measurement quantities. The UE also records the quantities that the UE needs to observe in addition to the UE position. Examples of such quantities include RSRP of the serving cell and applicable neighbor cells, one-way propagation delay (OPD) between the UE and the platform, and elevation angle toward the serving cell. As mentioned earlier, the round trip propagation delay between the UE and the platform or between the UE and the gNB can be used although the OPD is a more direct indication of the distance between the UE and the platform (e.g., a satellite).

If the gNB has specified an RSRP threshold for the reporting of neighbor cells ("Thresh_RSRP_NeighborSearch_PositionValidation), the UE records it as well to decide if it may include a neighbor cell in the UE's report or not.

In step F8S1, the gNB may specify a set of all the neighbor cells of the serving cell is specified in a SIB, where such set can be different from the typical neighbor list used for cell reselection and handover. The UE keeps track of such neighbor list for position validation measurements. In the absence of the RSRP threshold, the UE may be required to report RSRPS of a detected neighbor cell per specifications.

In step F8S2, the UE receives from the gNB the platform's position and time associated with such position.

In an example implementation, the UE may receive in a SIB a distinct piece of information that specifies the instant at which the platform is expected to broadcast such SIB. The UE can then compare its own current time with the time in the SIB to estimate the OPD. In another approach, the UE calculates the OPD based on its GNSS-based position and the platform's position.

In step F8S3, the UE may receive a dedicated RRC signaling message from the gNB that conveys the information specified in step F8S1. In such case, such information can be UE-specific and overwrites the broadcast information. The UE may receive such RRC signaling via unicast signaling or groupcast/multicast signaling.

In step F8S4, the UE checks if it is time to estimate its position and make validation measurements per configuration by the gNB. If not, the UE waits for such instance. If yes, the UE executes step F8S5.

In step F8S5, the UE estimates its position, makes validation measurements per configuration by the gNB, and keeps track of historical positions and measurements.

In step F8S6, the UE checks if it is time to report its position and make validation measurements per configuration by the gNB. If not, the UE goes to step F8S4. If yes, the UE executes step F8S7.

In step F8S7, the UE reports its position and validation measurements to a suitable network function such as the gNB, the AMF, and the LMF. To reduce the size the reported measurements, reference propagation delay and reference time may be defined (e.g., the first set of measurements can correspond to fully-specified reference delay and time). The remaining measurements can be specified relative to the reference delay and time. Time can be avoided if the periodicity is fixed and measurements correspond to such periodicity. The reference delay may be broadcast in SI (e.g., minimum OPD). In another reporting approach, a formula can be defined, where the reported values are indexes or values from a table defined in the standard.

The mechanism of UE position validation provided in the present disclosure can be applied to various scenarios. In an example embodiment of the present disclosure, the UE position is used by the network to properly serve UEs near the border between the countries. For example, the UE physically located in one country needs to be served by the core network associated with such country and not another country.

In a terrestrial network (TN), it is relatively easy to carry out radio network planning and design such that a cell near the border between the countries only covers the target country. For example, antenna down-tilting and antenna height can be adjusted to ensure that the RF coverage of the cell of one country/PLMN does not spill into another country.

In an NTN with earth-moving beams (and to some extent quasi-Earth-fixed beams), confining coverage of a cell inside a specific country is not practical, because an attempt to do so may create a huge area (i.e., the size of the cell such as a cell with the 1000 km diameter) without any service. Hence, a solution that minimizes such "no man's land" or "buffer zone" is desirable for an NTN.

To serve the UE by the correct network in an NTN, the following procedure can be utilized in an example embodiment of the present disclosure.

Here is an example procedure that can help address the country border scenario.

In step CB1, the UE reports its GNSS-based position and configured measurements such as historical (i.e., multiple samples at different instants) RSRP and UE-NTN platform delay to the network. In an example approach, this delay is based on the transmit time broadcast by the gNB and the receive time at the UE to remove dependence of the delay on the UE-reported position. In another approach, this delay is based on the UE location and the platform's location.

In step CB2, the gNB validates the UE-reported position using UE-reported historical RSRPs and time delays in an implementation-specific manner and reports such validated position to a network function (NF) of the correct core network. In one example approach, this NF is an AMF. In another example, this NF is an LMF. The gNB may inform both the AMF and the LMF about the UE's location.

In step CB2, in an example embodiment of the present disclosure, the gNB also determines the identity of a virtual cell. Such virtual cell is associated with an Earth-fixed geographic area. The gNB reports the ID of the virtual cell to the correct core network's NF. In another approach, the gNB also reports characteristics of such virtual cell (e.g., (i) cell center and cell radius of a hexagon-shaped virtual cell or cell center or (ii) cell center, major axis, and minor axis of an elliptical virtual cell). The virtual cells can match the NTN beam shape or can be completely independent of NTN beams/cells. Such virtual cells can be made arbitrarily small to obtain the positioning "cell-level granularity" that is comparable to the "cell-level granularity" in a TN.

In an embodiment of the present disclosure, the virtual cell characteristics are absent in the gNB to the core network NF message, such NF is informed about the virtual cell ID and characteristics of virtual cells of a given service area (which could be part of a country, entire country, or even multiple countries) by an entity such as OAM and an Application Server. The NF can also be made aware of the virtual cell specifics via local provisioning.

In step CB3, the gNB can use the validated UE position (with or without the knowledge of the virtual cell) to perform functions per policy associated with the PLMN of the correct country. In another approach, the gNB perform functions to under explicit directions from a suitable entity such as the AMF, OAM, or an application server. In case of the UE attempting to connect to an incorrect PLMN, the gNB and/or the core network NF such as the AMF can block the UE as described below.

In step CB4, the AMF can use the validated UE position and possibly virtual cell ID specifics to perform functions such as registration and registration updates and to possibly provide updated policies to the gNB.

In step CB5, the LMF may use the validated UE position and possibly virtual cell ID specifics to meet regulatory requirements such as an emergency call or session and Lawful Intercept (LI) or support non-regulatory location based services.

In an embodiment of the present disclosure, virtual cells near the country border can be designed (e.g., made smaller or larger) compared to virtual cells in non-border regions.

In support of the country border distinction during the cell selection (and subsequent random access when applicable), in an embodiment of the present disclosure, the gNB specifies in system information an indicator that defines a criterion for a UE to be able to connect to the PLMN in the correct country. In an example approach, such indicator may be the time stamp till which a given PLMN is available to UEs. Another approach specifies the instant after which a given PLMN is available for use in the cell. Such PLMN indications can be provided to UEs via dedicated signaling in another embodiment of the present disclosure.

When an NTN cell may cover two countries simultaneously, in such cell, the gNB advertises PLMN IDs and instants for the availability of such PLMNs. For example, in case of two PLMNs, the gNB advertises a PLMN P1 (in country 1) that is available till time t1 and advertises a PLMN P2 (in country 2) that is expected to be available after time t2. This knowledge can be used by UEs during cell reselection based on their authorizations of PLMNs. In an example approach, the idle/inactive UEs in a country physically located in country 2 associated with PLMN P2 and authorized for PLMN2 only can attempt to do cell reselection to this NTN cell at or after t2.

In another embodiment, a UE just beginning to do cell reselection toward a given PLMN may wait for another NTN cell to arrive when the existing cell providing connectivity toward the target PLMN is about to stop serving the area where the UE is currently located.

When a UE in the country border area tries to connect to the NTN cell (e.g., RRC connection setup/resumption and registration update) that spans multiple countries, the gNB and/or the core network NF (e.g., the AMF) blocks this UE if the physical location of the UE is found to be in a different country based on the PLMN serving times (e.g., the times specified by t1 and t2) and if the UE is trying to connect to an incorrect PLMN. In an example approach, the network specifies in RRC/NAS signaling the cause for such blocking (e.g., "Incorrect PLMN Selected"). In an example approach, the UE is informed about the next instant (absolute time stamp or a timer) when the UE can make a next connection attempt toward a correct PLMN. The network may also specify the ID of the correct PLMN to the UE.

RRC_CONNECTED UEs near the country border can also be informed about instants such as t1 and t1 to facilitate operations such as handover. It is possible that UEs in RRC_CONNECTED state may cross from one country to another and such UEs may have authorization to use PLMNs of different countries. Such UEs can be informed about allowed PLMNs prior to the PLMN crossing. The gNB informs a core network NF such as the AMF about the UE's crossing so that country-specific/PLMN-specific policies can be enforced.

Figure 17:
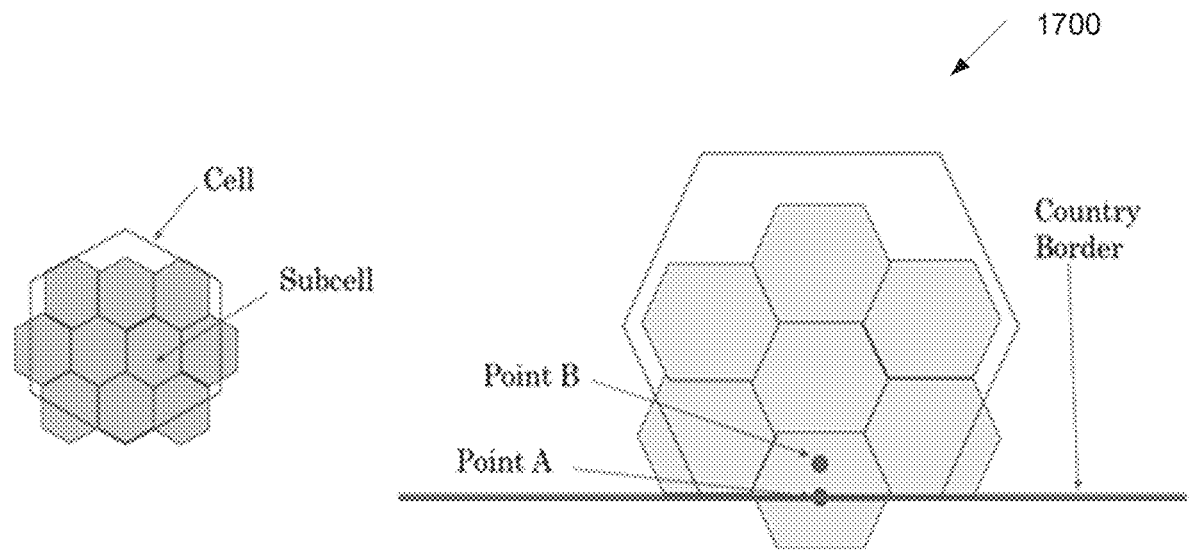
FIG. 17 illustrates an example of subcell near country borders according to embodiments of the present disclosure.

FIG. 17 illustrates an example of subcell near country borders 1700 according to embodiments of the present disclosure. An embodiment of the subcell near country borders 1700 shown in FIG. 17 is for illustration only.

In an example embodiment, the identity of a virtual cell and a virtual subcell (shown in FIG. 17) are determined by the UE. In another embodiment, the identity of a virtual cell and a virtual subcell are determined by the gNB. In yet another embodiment the identity of a virtual cell and a virtual subcell are determined by both the UE and the gNB.

In an example embodiment, the identity of the earth-fixed tracking area (e.g., virtual tracking area or any other tracking area that is fixed on the earth) is determined by the UE. In another embodiment, the identity of the earth-fixed tracking area (e.g., virtual tracking area or any other tracking area that is fixed on the earth) is determined by the gNB. In yet another embodiment the identity of the earth-fixed tracking area (e.g., virtual tracking area or any other tracking area that is fixed on the earth) is determined by both the UE and the gNB.

Various embodiments of the present disclosures specific to the areas of (A) layout and identities of virtual cells, (B) determination of virtual cell and fixed-earth TA identities by the UE, (C) determination of virtual cell and fixed-earth TA identities by the gNB, (D) identification of the country near the cell border, and (E) impact of virtual cells on operations (e.g., cell reselection and mobility management such as handover) are described below.

In one embodiment, layout and identities of virtual cells are provided.

Figure 16:
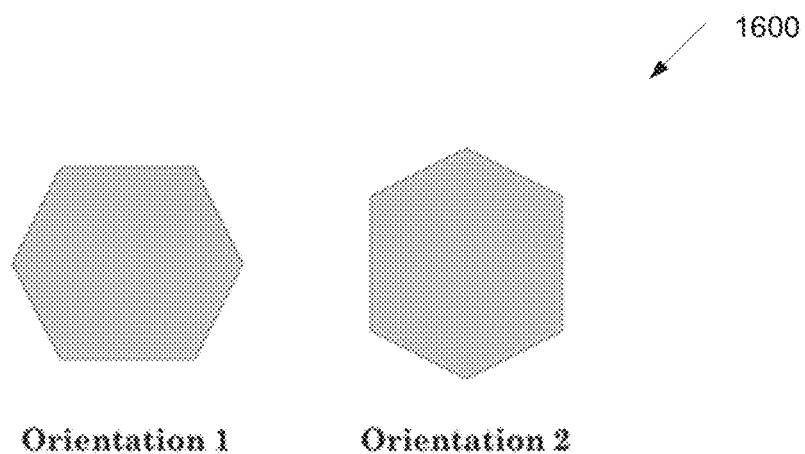
FIG. 16 illustrates an example of a hexagonal layout according to embodiments of the present disclosure.

In an embodiment of the present disclosure, when hexagonal cells are used to represent virtual cells, the orientation of the hexagon is specified as part of the virtual cell layout characteristics. For example, as shown in FIG. 16, the layout needs to identify whether a hexagonal cell is of Orientation 1 or Orientation 2. Other orientations with different rotations of the hexagon are also possible.

FIG. 16 illustrates an example of a hexagonal layout 1600 according to embodiments of the present disclosure. An embodiment of the hexagonal layout 1600 shown in FIG. 16 is for illustration only.

In another embodiment of the present disclosure, virtual cells near the country border area are divided into smaller geographic areas "subcells" to facilitate more accurate estimation of the country where the UE is physically located compared to the case where regular-sized virtual cells are used (e.g., FIG. 17).

In an example approach, the subcells are hexagons for easier or simpler calculations to estimate the identity of the virtual cell or virtual subcell. In another example approach a non-hexagon geometric shape (e.g., a triangle) is used for a subcell.

In an example approach, hexagonal subcells (and full hexagons instead of partial hexagons) are prioritized over other geometric shapes near the border while designing the layout of virtual cells. The centers of hexagonal subcells used as reference points for the purpose of determining the identities of (i) the virtual cell and (ii) the subcell of the virtual cell associated with the UE location.

In an example approach, for partial (i.e., incomplete) hexagons representing a virtual cell or a virtual subcell, centers of associated "full" hexagons (i.e., Point A in FIG. 17) are used as reference points. In another example approach, centers of the geometric areas are used as reference points (i.e., Point B in FIG. 17).

In an embodiment of the present disclosure, virtual cells separate one country from another country. In other words, one virtual cell is in the north of the border, and another virtual cell is in the South of the border. In another embodiment of the present disclosure, virtual subcells of the same virtual cell separate one country from another country. In other words, one virtual subcell of the virtual cell X is in the north of the border, and another virtual cell of the same virtual cell X is in the south of the border.

To identify a virtual cell, in an embodiment of the present disclosure a hierarchical structure is used to facilitate faster and more efficient of virtual cells (and subcells). Just like there is a hierarchy of a country, states of a country, and cities in a state, the virtual cell identity has a virtual super area ID (VSUP_ID), virtual area ID (VA_ID), and virtual subarea ID (VSUB_ID), and cell ID (CID) associated with the combination (VSUP_ID, VA_ID, and VSUB_ID). While 4 levels (including 3 types of areas and cell) are used an example, more or fewer levels can be used in another approach.

In an example approach, an indicator of the border cell/subcell is identified in the ID-cell specific mapping. Such indicator can be implicit or explicit. For example, the absence of certain information or presence of certain information can imply whether a cell is a border cell or not. For example, an explicit indicator value of "1" implies a border cell and "0" implies a non-border cell or vice versa. Similarly, if the border indicator is absent, it can refer to a non-border cell, and, the presence of such indicator or other Information Elements (e.g., subcells) indicates a border cell.

In an embodiment of the present disclosure, the mapping between the identities of virtual cells (and virtual subcells) and the characteristics/specifics of such cells (e.g., Reference Points such as centers of hexagonal cells or other geometric shapes, cell radius, and orientation of the cell) are conveyed to the UE using means such as provisioning of the SIM/UE. In another embodiment, Over-The-Air updates using an NTN or a TN (e.g., cellular or WiFi) with the help of the OAM or a suitable Application Server are used to convey such mapping to the UE.

In an embodiment of the present disclosure, the mapping between the virtual cells (and virtual subcells) and identities of earth-fixed tracking areas is conveyed to the UE using means such as provisioning of the SIM/UE. In another embodiment, over-the-air updates using an NTN or a TN (e.g., cellular or WiFi) with the help of the OAM or a suitable application server are used to convey such mapping to the UE.

In an example embodiment, in the representation of the mapping between the identities and cell/subcell specifics, the information is structured into to two or more of the following classes to create a compact representation (and reduce the file size to save on memory and simplify UE processing): (i) information common to all virtual cells (e.g., cell orientation and cell radius), (ii) information common to a set of cells (e.g., country and virtual super area), and (iii) information specific to cells and subcells (e.g., reference points and radii and country when applicable).

In an embodiment of the present disclosure, the virtual cell layout is maintained across country borders. Such approach simplifies virtual cell planning but requires virtual subcells to be associated with countries.

In another embodiment of the present disclosure, different virtual cell layouts are used in different countries. Such approach is more complex when more than two countries have suitable and simplifies virtual cell planning when an NTN radio network operator serves geographic areas spanning two or more countries.

In one embodiment, a determination of virtual cell and earth-fixed tracking area identities by the UE is provided.

If the UE determines the identity of a virtual cell and possibly a virtual subcell, the UE uses the mapping between the identities of the cells/subcells and associated characteristics/specifics and its GNSS-based location. In an example embodiment, to facilitate this operation by the UE, the gNB broadcasts assistance information in system information (e.g., in an enhanced R16 SIB or a new NTN SIB). In an example approach, this assistance information includes one or more of the following: (i) area identities such as identities of virtual super areas, virtual areas, and virtual subareas, (ii) explicit or implicit indication of a country border area, (ii) indication of the countries (e.g., mobile country code inside PLMN ID or standalone specification of the MCC).

The gNB may indicate the country border area using an explicit or implicit indicator. For example, the absence of an indicator or presence of certain information can imply that the cell is or would in future illuminate a country border. For example, an explicit indicator value of "1" implies a country border area and "0" implies a non-border geographic area or vice versa. Similarly, if the country border area indicator is absent, it can refer to a non-border area, and, the presence of such indicator or other Information Elements indicates a border area.

In an example embodiment, to reduce frequent changes to system information and/or to make the system information relevant to the current system information window (e.g., 160 ms or other time period), the gNB indicates the border area that its cell expects to illuminate in (i) the current SI window, (ii) in the current and 1 or more future SI windows, or (iii) a specific period determined by the gNB. This SI window corresponds to the system information that carries an implicit or explicit border area indication.

After determining the identity of one or more virtual cells/subcells where the UE is located, the UE reports to the network them via RRC and/or NAS signaling. In an embodiment of the present disclosure, per configuration by the gNB via RRC signaling such as RRC Setup or RRC Reconfiguration message (or the AMF via NAS signaling) or per rules defined by specifications (e.g., near the country border), the UE reports closest N virtual cells (N: 1 or more) and M virtual subcells per virtual cell (M: 0 or more) to the network.

In an example approach, the UE is configured to report only those cells and subcells that meet a distance threshold with a limit on the number of cells such as N and M. The values of M, N, and distance threshold can be specified by the gNB or the AMF or defined in specifications. As an example, the UE reports a virtual cell/subcell when the UE is within X meters of such cell, where suitable reference points such as cell centers are used by the UE to calculate the distances. In another example approach, the UE also reports its velocity (i.e., speed if available and direction of travel if available) autonomously or per configuration by the gNB.

The reporting of subcells is based on the need (e.g., near country borders). The UE may report its confidence about the estimation quantitatively or qualitatively (e.g., less reliable due to poor GNSS availability or old GNSS location or an indicator of positioning ambiguity). The UE may report an absolute or relative time of the GNSS-based location used in the virtual cell ID determination in an example approach.

In an example embodiment of the present disclosure, the UE determines the identity of the earth-fixed tracking area (where the UE is located) using the estimated identities of the virtual cells/subcells and the mapping between the virtual cell/subcell identities and the earth-fixed TAs. The UE may report its confidence about the earth-fixed tracking area ID quantitatively or qualitatively (e.g., less reliable due to poor GNSS availability or old GNSS location or an indicator of positioning ambiguity). The UE may report an absolute or relative time of the GNSS-based location used in the earth-fixed tracking area ID determination in an example approach.

In an example embodiment, the UE reports to the network historical GNSS-based locations and estimated virtual cell/subcell IDs along with timestamps. A set of N entries is provided by the UE per configuration or per specifications.

In one embodiment, a determination of virtual cell and earth-fixed tracking area identities by the gNB is provided.

In an example embodiment of the present disclosure, upon receiving the UE's GNSS location and possibly velocity along with signal and non-signal measurements (e.g., RSRP, timing advance, and delays), the gNB determines the identities of one or more virtual cells and subcells using UE information and the cell/subcell ID-cell specifics. The gNB learns about the mapping between the cell/subcell ID and specifics/characteristics of such cells/subcells through local configuration or from OAM or an application server in an example approach. The AMF learns about the mapping between the cell/subcell ID and specifics/characteristics of such cells/subcells through local configuration or from OAM or an application server in an example approach.

In an example embodiment of the present disclosure, the gNB determines the identity of the earth-fixed tracking area where the UE is located using self-estimated identities of the virtual cells/subcells and the mapping between the virtual cell/subcell identities and the earth-fixed TAs. The gNB learns about the mapping between the virtual cell/subcell identities and the earth-fixed TAs through local configuration or from OAM or an application server in an example approach. The AMF learns about the mapping between the virtual cell/subcell identities and the earth-fixed TAs through local configuration or from OAM or an application server in an example approach.

In another embodiment of the present disclosure, the gNB determines the identity of the earth-fixed tracking area where the UE is located using UE-reported identities of the virtual cells/subcells and the mapping between the virtual cell/subcell identities and the earth-fixed TAs. In an example approach, the gNB verifies the UE-reported cell identities using signal and non-signal measurements.

In yet another embodiment of the present disclosure, the gNB determines the identity of the earth-fixed tracking area where the UE is located using UE-reported GNSS-based location or both UE-reported GNSS-based location and UE-reported identities of the virtual cells/subcells along with the mapping between the virtual cell/subcell identities and the earth-fixed TAs.

In an example embodiment of the present disclosure, the gNB provides to the AMF the identity of the earth-fixed TA that is derived using the concept of virtual cells/subcells via next generation application protocol (NGAP) signaling (e.g., INITIAL UE MESSAGE). The existing IE conveying the "TAI" in NGAP signaling messages can be used to convey such earth-fixed TA identity or a new IE (possibly an indicator for regular or virtual TA) can be used to separate a virtual TA from a regular TA in an NTN in an embodiment of the present disclosure.

In another example approach, the gNB also provides identities of one or more virtual cells and 0 or more subcells and optionally characteristics of those cells/subcells (e.g., reference points and radius). In yet another example approach, the gNB provides UE-reported GNSS based location and velocity information to the AMF via NGAP signaling to enable the AMF to determine a suitable registration area (i.e., TAI List) for the UE. The gNB may provide an indicator of its confidence about the tracking area ID estimation to the AMF.

In one embodiment, an identification of the country near the cell border is provided.

The knowledge of the virtual cells and subcells can be used by the UE to determine the identity of the fixed-earth TA and subsequently the country where the UE is physically located in an example embodiment of the present disclosure, because the TA identity includes the mobile country code.

The knowledge of the virtual cells and subcells can be used by the gNB to determine the identity of the fixed-earth TA and subsequently the country where the UE is physically located in an example embodiment of the present disclosure, because the TA identity includes the mobile country code.

In one embodiment, an impact of virtual cells on operations is provided.

In an example embodiment of the present disclosure, upon crossing a country border (even within the same physical cell or beam of a physical cell), the UE informs the network about the border crossing via RRC and/or NAS signaling so that the network can enforce country-specific regulations. Such intra-cell border crossing does not arise in a TN, because different cells cover different sides of the border in a TN. Such border crossing can occur in any of the 3 RRC states-connected, inactive, and idle.

In an example embodiment of the present disclosure, a new IE in an existing message is defined to convey the border crossing indication and the country code/PLMN.

In an example embodiment of the present disclosure, NAS messages such as registration request and UL NAS Transport messages are used by the UE to convey the border crossing indication and the country code/PLMN.

In an example embodiment of the present disclosure, RRC messages such as RRC setup request, RRC setup complete, RRC reconfiguration complete, and measurement report are used by the UE to convey the border crossing indication and the country code/PLMN.

In yet another embodiment, a new RRC/NAS message is defined to convey the border crossing indication and the country code/PLMN.

Figure 18:
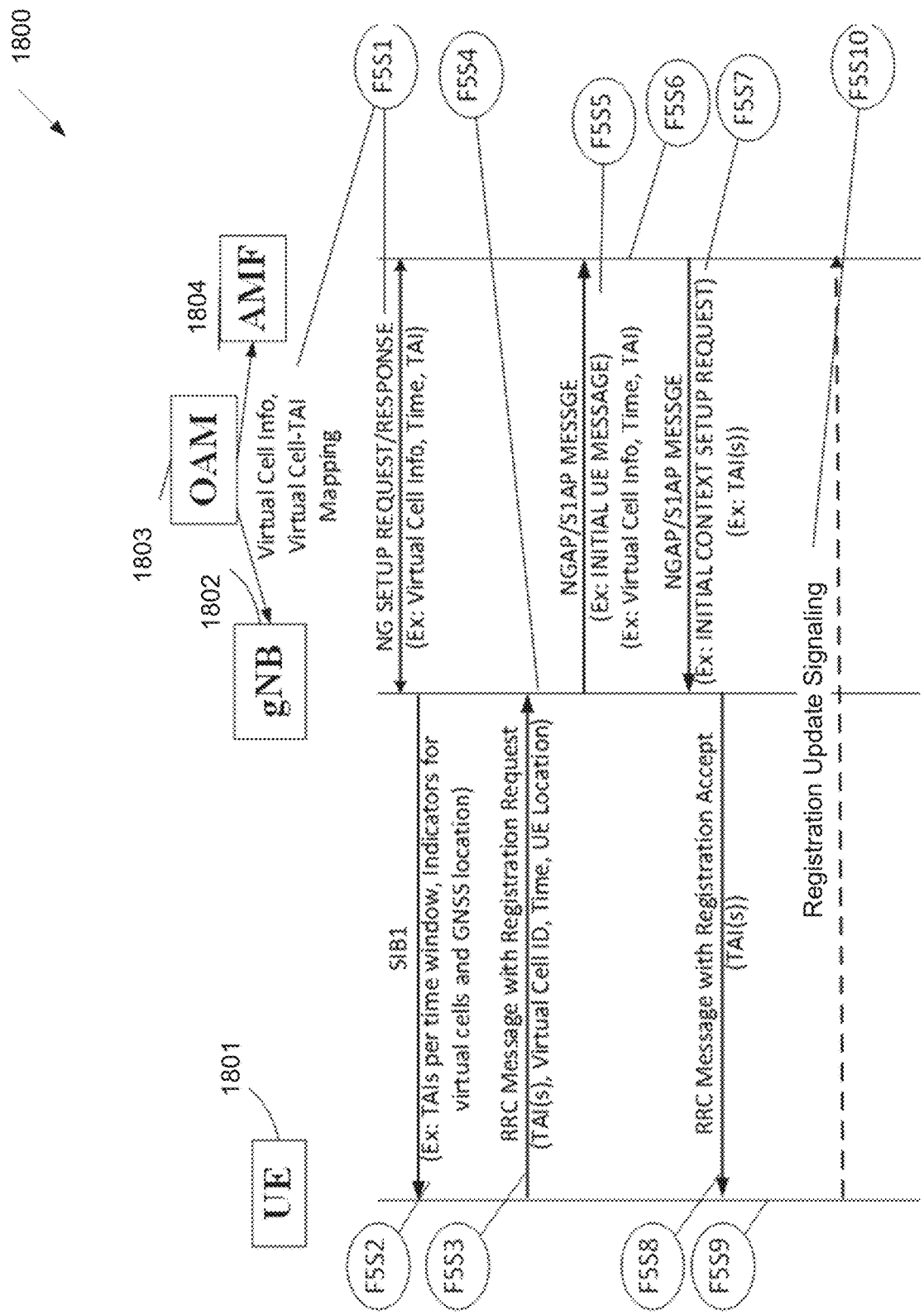
FIG. 18 illustrates a signaling flow of a UE-network procedure for soft TAI update management according to embodiments of the present disclosure.

FIG. 18 illustrates a signaling flow of a UE-network procedure 1800 for soft TAI update management according to embodiments of the present disclosure. For example, the UE-network procedure 1800 as may be performed by a UE (e.g., 111-116 as illustrated in FIG. 1) and a BS (e.g., 101-103 as illustrated in FIG. 1). An embodiment of the UE-network procedure 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

FIG. 18 illustrates the overall UE-network procedure to illustrate overall example embodiments of the present disclosure to manage soft/hard TAI updates. While FIG. 18 and associated descriptions are directly applicable to the soft TAI update approach, many elements of the disclosure are applicable to the hard TAI update approach as well.

In step F5S1, in an example embodiment of the present disclosure, a suitable network entity such as operations, administration, and maintenance (OAM) or an application server (AS) provides earth-fixed virtual cell specifics to network functions such as the gNB and the AMF. These cell specifics are cell IDs and cell's coverage area in the form of cell's geometry-based characteristics such as cell center, cell radius, and cell orientation (e.g., due North being a point or a line segment) for a hexagonal cell (preferred for high performance), cell center and a cell radius for a circular cell, and cell center, major axis, minor axis, and cell orientation (e.g., major axis at an angle relative to a reference line) for an elliptical cell).

In another embodiment of the present disclosure, the OAM/AS provides the mapping between the virtual cells and the earth-fixed TAs to the gNB and/or the AMF.

In yet another embodiment of the present disclosure, the OAM/AS provides the mapping between the earth-fixed TAs and gNBs (along with possibly NCGIs) to the AMF so that the AMF can send a page message to the correct gNB(s) serving one or more target TAIs. Note that this mapping would be time-based (i.e., a function of time) for quasi-earth-fixed beams and earth-moving beams.

In another approach, gNBs can provide information about their IDs, their cells (e.g., NCGIs), and time-based virtual cells and earth-fixed TAs that their cells or beams are covering during specific time windows to the AMF (e.g., as part of NG setup signaling). The AMF can then build a complete database after communicating with all relevant gNBs. In an example approach, the gNB utilizes the RAN configuration update procedure on the N2/NG interface to provide such updated information about virtual cells and earth-fixed TAs; the gNB sends RAN CONFIGURATION UPDATE message to the AMF to provide the updated information to the AMF, and the AMF responds with RAN CONFIGURATION UPDATE ACKNOWLEDGE.

In step F5S2, in an embodiment of the present disclosure, the gNB broadcasts TAIs in SIB1 such that these TAIs include not only the TAs illuminated by the cell's beam but also the TAs that are expected to be illuminated by the cell's beam in future. In an example approach, the gNB broadcasts TAIs of all the TAs that are expected to be illuminated at any instant during a target time window. This target window can be defined to be the SIB1 window (e.g., 160 ms in 5G NR) in an example approach. Non-SIB1 time windows are defined for conveying TAIs in SIB1 or other SIBs (e.g., those for a TN or an NTN) in another example approach. The TAI-carrying SIB is compatible with Earth-fixed TAs such that a UE located in a given TA would always find its TAI in the TAIs being broadcast by the gNB.

Furthermore, this system information is contained in an R16-defined TN SIB or a new NTN SIB, or distributed between a TN SIB and an NTN SIB.

In an embodiment of the present disclosure, the SIB carrying multiple TAIs

In step F5S2, in an example approach, the gNB broadcasts in system information an indication of one or more of the following features: (i) its use/support of earth-fixed virtual cells, (ii) the need for the UE to report its GNSS-based location in registration/tracking area update related AS/NAS messages, and (iii) the need for the UE to report identities of one or more virtual cells in registration/tracking area update related AS/NAS messages. In the absence of one or more of such indications, the related reporting can be made mandatory for the UE via specifications or rules.

In step F5S2, in an embodiment of the disclosure, the gNB broadcasts a compact representation of TAIs in a SIB. For example, instead of broadcasting full TAIs, the gNB separates the common part of TAIs (e.g., common fields across the broadcast TAIs such as PLMN ID) and dedicated parts of TAIs. This may reduce the size of the SIB. In one approach, the common part can be indicated first, followed by dedicated parts of different TAIs. In another approach, the first TAI is fully specified and remaining TAIs are specified by defining dedicated non-common parts.

In Step F5S3, to perform registration, the UE sends an RRC message that encapsulates a NAS message to get registered with the core network. In an LTE network, the UE may encapsulate the NAS attach request message in the RRC connection setup complete message. In a 5G network, the UE may encapsulate the NAS registration request in the RRC setup complete message. The NAS message, attach Request, or registration request, contains the last visited registered TAI if available.

In step F5S3, in an example embodiment of the present disclosure, when the UE sends to the network a registration request message including one or more of the following: (i) TAIs observed by the UE, (ii) its GNSS-based location along with an indication about the UE's confidence on the accuracy of this location with possible indication of "GNSS not visible/GNSS visibility poor/GNSS visible", for example, the accuracy of the location can be also implicitly included in the GNSS-based location information, (iii) its virtual cell ID, (iv) time stamp associated with the GNSS-based location, and (v) estimated speed and direction of travel (if available).

In an embodiment of the disclosure, in step F5S3, the UE provides the most recent measurements (e.g., RSRPs, time delays, and/or timing advance) of the serving cell and up to N neighboring cells (where applicable) in an RRC message that accompanies the NAS registration request message. These measurements enable the gNB/eNB to determine or validate the virtual cell ID or the GNSS-based UE location.

The LTE eNB/5G gNB processes the received RRC message in step F5S4. In an embodiment of the present disclosure, the gNB uses the UE-reported GNSS location to determine the virtual cell identity and provides such identity to the AMF in step F5S6. In another embodiment of the present disclosure, the gNB maps the virtual cell identity that it has determined or obtained from the UE (and possibly validated by the gNB) to the earth-fixed TAI. The gNB may estimate the UE location if the UE has not provided the location or if the UE has indicated poor GNSS visibility or if the time stamp associated with the UE-reported GNSS location is old from the gNB's perspective.

In step F5S5, the gNB/eNB forwards the UE's NAS message to the AMF/mobile management entity (MME) using an NGAP/S1AP message such as INITIAL UE MESSAGE or UPLINK NAS TRANSPORT. The traditional R16 NGAP/S1AP message includes the TAI and the cell identity where the RRC message from the UE has been received. The cell identity is ECGI for LTE and NR CGI for 5G. The NGAP INITIAL UE MESSAGE also includes the timestamp (UTC or Universal Coordinated Time) as part of "User Location Info" field. The user location in the typical NGAP/S1AP message is the cell identity.

In step F5S5, in an example embodiment of the present disclosure, the gNB includes one or more of the following to enable the MME/AMF to create a compact and accurate TAI list: (i) UE-reported (and possibly gNB-validated) GNSS-based location or the gNB-estimated UE location, (ii) UE-reported (and possibly gNB-validated) or gNB-determined virtual cell ID, (iii) UE-reported TAIs, (iv) gNB-determined TAI or TAIs.

In an example approach, the gNB/eNB sends a single virtual cell ID to the MME/AMF. In another approach, the gNB/eNB sends multiple virtual cell IDs to the MME/AMF (e.g., when a single virtual cell ID may not be reliable, which is the case when a UE is near the border of two or more virtual cells).

In yet another approach, the gNB/eNB sends a single TAI to the MME/AMF. This TAI reflects UE's GNSS-based location and/or the virtual cell ID. In one more approach, the gNB/eNB sends multiple TAIs to the MME/AMF to enhance reliability of the registration to be carried out by the MME/AMF. In an example approach, this TAI identifies an Earth-fixed TA. In another approach, one or more TAIs reflect the TAIs being broadcast by the gNB in a cell at a suitable instant.

The AMF/MME, in step F5S6, determines the geographic area where the UE would be considered registered. Such geographic area is called registration area in 5G and is represented by a TAI List in 5G and 4G. In an example embodiment of the present disclosure, the AMF uses the information such as the UE's GNSS-based location, UE's speed and direction of travel (if available), virtual cell ID, and TAI(s) to create a compact and/or accurate TAI List as the registration area for the UE to strike a balance between the paging load and paging delay/reliability. For example, if the UE is in the right-most or eastern portion of a TA, the AMF may register the UE in the TAs that are to the right of the current TA in addition to the current TA and skip the TAs that are left of the current TAs.

In step F5S7, the AMF/MME sends NGAP/S1AP message (e.g., INITIAL CONTEXT SETUP REQUEST or DOWNLINK NAS TRANSPORT) containing the NAS registration accept/attach accept message to the gNB/eNB. The gNB/eNB encapsulates the NAS registration accept/attach accept message in an RRC message (e.g., RRC Reconfiguration in 5G and RRC connection reconfiguration in LTE) in step F5S8.

The UE in step F5S9 stores the TAI List to decide when to carry out a mobility registration update. For example, if the UE detects that the UE has entered a TA that is not in the TAI List, the UE initiates the mobility related registration update by sending a message such as registration request in 5G and tracking area update request in LTE in Step F5S10.

In an LTE network, after the attach procedure has been carried out, the tracking area update (TAU) occurs using the NAS messages tracking area update request and tracking area update accept, which replace the NAS messages attach request and attach accept, respectively, in FIG. 18.

Figure 19:
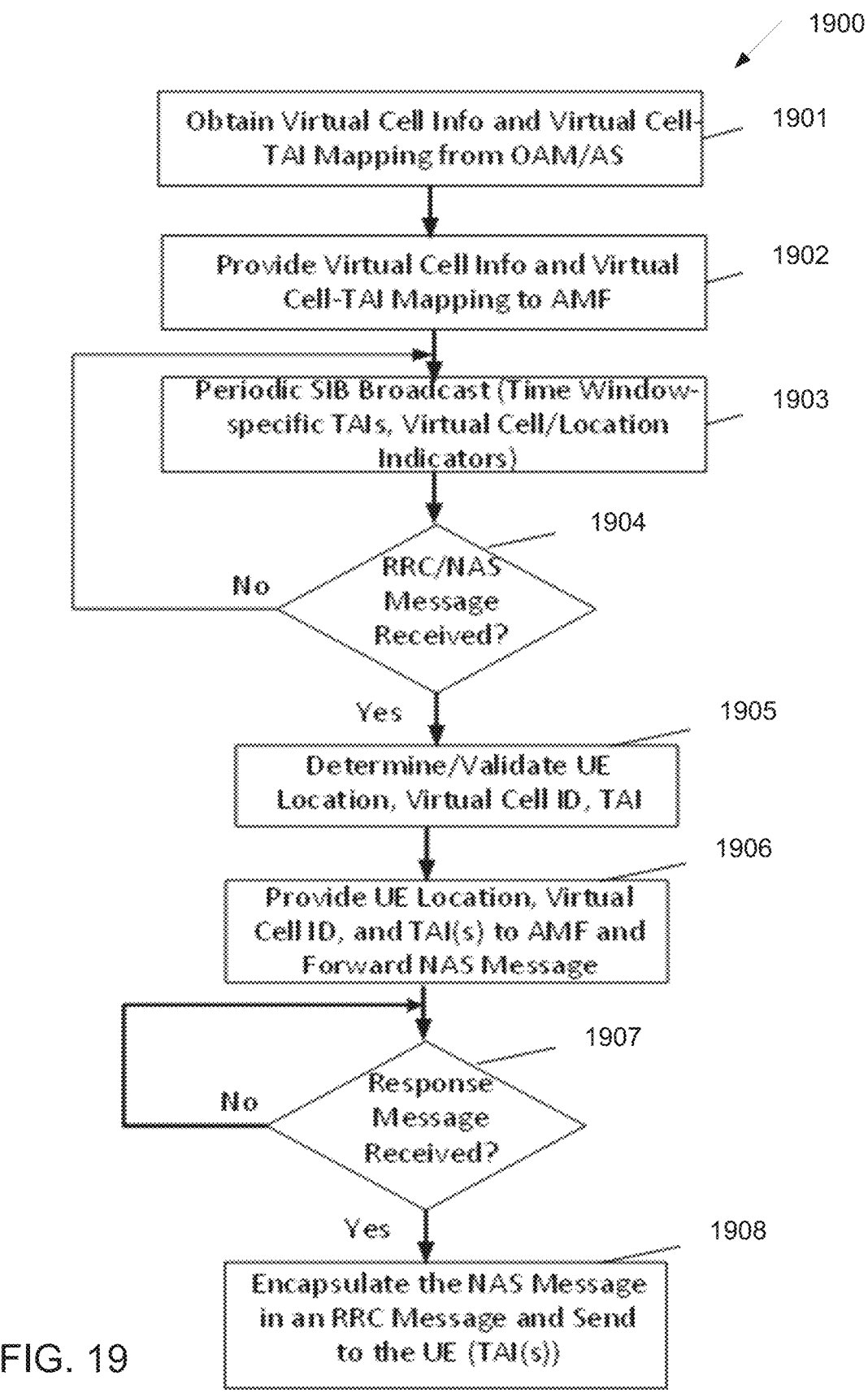
FIG. 19 illustrates a flowchart of a method for soft TAI update management according to embodiments of the present disclosure.

FIG. 19 illustrates a flowchart of a method 1900 for soft TAI update management according to embodiments of the present disclosure. For example, the method 1900 as may be performed by a BS such as 101-103 as illustrated in FIG. 1. An embodiment of the method 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions.

As illustrated in FIG. 19, in step 1901, in an example embodiment of the present disclosure, the gNB receives from OAM or an AS earth-fixed virtual cell specifics. These cell specifics are cell IDs and cell's coverage area in the form of cell's geometry-based characteristics such as cell center and cell radius for a hexagonal cell (preferred for high performance), cell center and a cell radius for a circular cell, and cell center, major axis, and minor axis for an elliptical cell).

In another embodiment of the present disclosure, the gNB receives the mapping between the virtual cells and the Earth-fixed TAs from the OAM/AS.

In step 1902, in an example approach, gNBs can provide information about their IDs, their cells, and time-based virtual cells and TAs that their cells are covering during specific time windows to the AMF (e.g., as part of NG setup signaling). The AMF can then build a complete database after communicating with all relevant gNBs.

In step 1903, in an embodiment of the present disclosure, the gNB broadcasts TAIs in SIB1 such that these TAIs include not only the TAs illuminated by the cell's beam but also the TAs that are expected to be illuminated by the cell's beam in future. In an example approach, the gNB broadcasts TAIs of all the TAs that are expected to be illuminated at any instant during a target time window. This target window can be defined to be the SIB1 window (e.g., 160 ms in 5G NR) in an example approach. Non-SIB1 time windows are defined for conveying TAIs in SIB1 or other SIBs (e.g., those for a TN or an NTN) in another example approach. The TAI-carrying SIB is compatible with earth-fixed TAIs such that a UE located in a given TAI would always find its TAI in the TAIs being broadcast by the gNB.

Furthermore, this system information is contained in an R16-defined TN SIB or a new NTN SIB, or distributed between a TN SIB and an NTN SIB.

In step 1903, in an example approach, the gNB broadcasts in system information an indication of one or more of the following features: (i) its use/support of Earth-fixed virtual cells, (ii) the need for the UE to report its GNSS-based location in registration/tracking area update related AS/NAS messages, and (iii) the need for the UE to report its GNSS-based location in registration/tracking area update related AS/NAS messages. In the absence of one or more of such indications, the reporting can be made mandatory for the UE via specifications or rules.

In step 1903, in an embodiment of the disclosure, the gNB broadcasts a compact representation of TAIs in a SIB. For example, instead of broadcasting full TAIs, the gNB separates the common part of TAIs (e.g., common fields across the broadcast TAIs such as PLMN ID) and dedicated parts of TAIs. This may reduce the size of the SIB. In one approach, the common part can be indicated first, followed by dedicated parts of different TAIs. In another approach, the first TAI is fully specified and remaining TAIs are specified by defining dedicated non-common parts.

In step 1904, the gNB checks if an RRC message with a NAS message for registration has been received or not. If yes, the gNB goes to step 1905. Otherwise, the gNB goes to step 1903 for periodic SI broadcast.

In step 1905, the gNB receives a UE's RRC message that encapsulates a NAS message to get registered with the core network. In an LTE network, the UE may encapsulate the NAS attach request message in the RRC connection setup complete message. In a 5G network, the UE may encapsulate the NAS registration request in the RRC setup complete message. The NAS message, attach Request, or registration request, contains the last visited registered TAI if available.

In step 1905, the LTE eNB/5G gNB also processes the received RRC message. In an embodiment of the present disclosure, the gNB uses the UE-reported GNSS location to determine the virtual cell identity and provides such identity to the AMF in step 1906. In another embodiment of the present disclosure, the gNB maps the virtual cell identity that it has determined or obtained from the UE (and possibly validated by the gNB) to the Earth-fixed TAI. The gNB may estimate the UE location if the UE has not provided the UE location or if the UE has indicated poor GNSS visibility or if the time stamp associated with the UE-reported GNSS location is old from the gNB's perspective.

In step 1906, the gNB/eNB forwards the UE's NAS message to the AMF/MME using an NGAP/S1AP message such as INITIAL UE MESSAGE. The traditional R16 NGAP/S1AP message includes the TAI and the cell identity where the RRC message from the UE has been received. The cell identity is ECGI for LTE and NR CGI for 5G. The NGAP INITIAL UE MESSAGE also includes the timestamp (UTC or Universal Coordinated Time) as part of "User Location Info" field. The user location in the typical NGAP/S1AP message is the cell identity.

In step 1906, in an example embodiment of the present disclosure, the gNB includes one or more of the following to enable the MME/AMF to create a compact and accurate TAI list: (i) UE-reported (and gNB-validated) GNSS-based location or the gNB-estimated UE location, (ii) UE-reported or gNB-determined virtual cell ID, (iii) UE-reported TAIs, (iv) gNB-determined TAI or TAIs.

In an example approach, the gNB/eNB sends a single virtual cell ID to the MME/AMF. In another approach, the gNB/eNB sends multiple virtual cell IDs to the MME/AMF (e.g., when a single virtual cell ID may not be reliable, which is the case when a UE is near the border of two or more virtual cells).

In yet another approach, the gNB/eNB sends a single TAI to the MME/AMF. This TAI reflects UE's GNSS-based location and/or the virtual cell ID. In one more approach, the gNB/eNB sends multiple TAIs to the MME/AMF to enhance reliability of the registration to be carried out by the MME/AMF. The information given by the gNB enables the MME/AMF to create a compact and/or accurate TAI List as the registration area for the UE to strike a balance between the paging load and paging delay/reliability.

In step 1907, the gNB/eNB checks if the response message from the AMF/MME has been received or not. If yes, the gNB/eNB goes to step 1908. Otherwise, the gNB/eNB waits for such message.

In step 1908, the gNB receives from the AMF/MME an NGAP/S1AP message (e.g., INITIAL CONTEXT SETUP REQUEST or DOWNLINK NAS TRANSPORT) containing the NAS registration accept/attach accept message, encapsulates the NAS registration accept/attach accept message in an RRC message (e.g., RRC Reconfiguration in 5G and RRC connection reconfiguration in LTE), and sends such encapsulated message to the UE.

Once the registration has been completed, the gNB/eNB may receive a registration request/update (or TAU Request for LTE). Steps shown in FIG. 19 are executed for such update as well.

Figure 20:
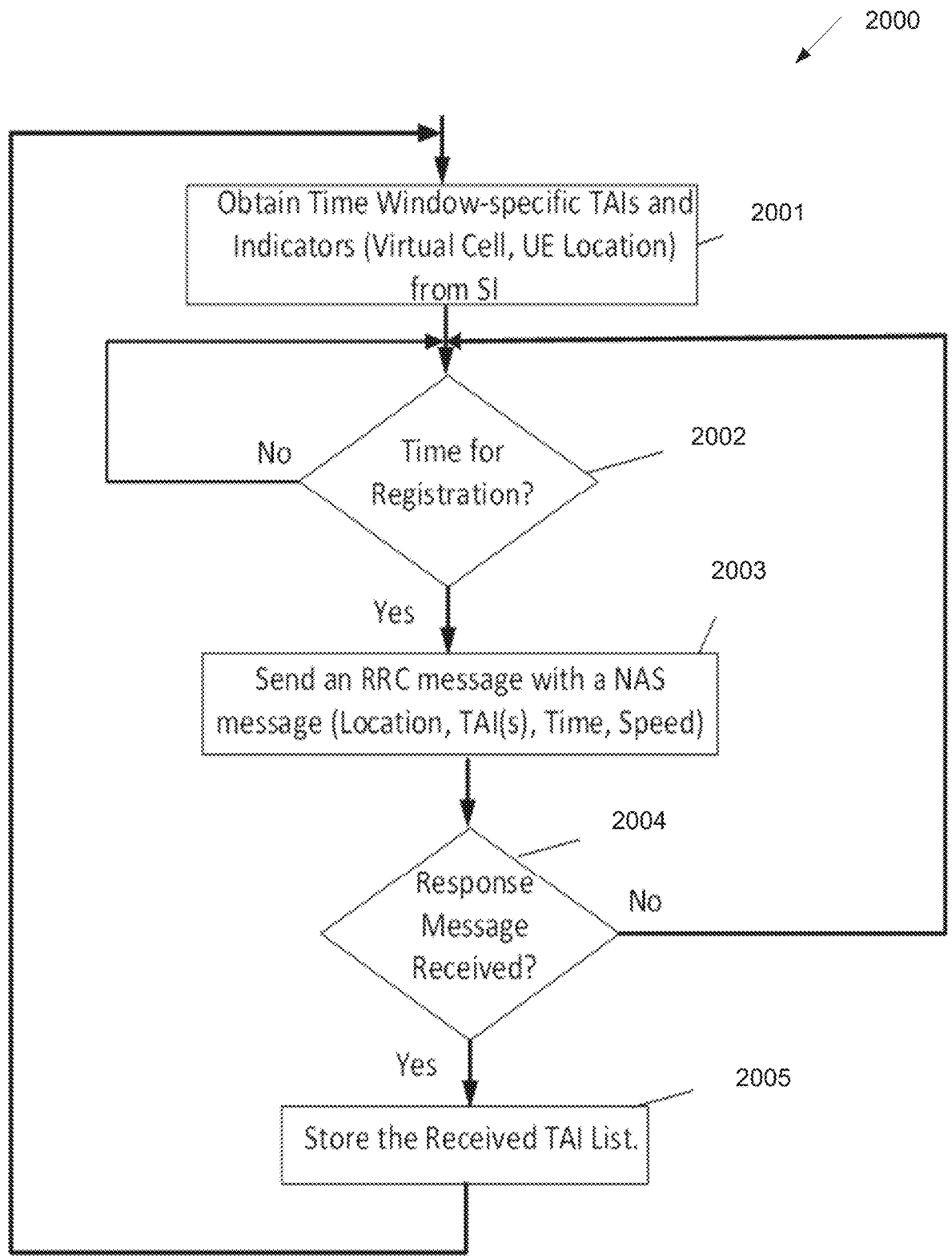
FIG. 20 illustrates a UE method for soft TAI update management according to embodiments of the present disclosure.

FIG. 20 illustrates a flowchart of a UE method 2000 for soft TAI update management according to embodiments of the present disclosure. For example, the UE method 2000 as may be performed by a UE such as 111-116 as illustrated in FIG. 1. An embodiment of the UE method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

As illustrated in FIG. 20, in step 2001, in an embodiment of the present disclosure, the UE receives TAIs in SIB1 such that these TAIs include not only the TAs illuminated by the cell's beam but also the TAs that are expected to be illuminated by the cell's beam in future. The TAI-carrying SIB is compatible with earth-fixed TAIs such that a UE located in a given TAI would always find its TAI in the TAIs being broadcast by the gNB.

In step 2001, in an example approach, the UE may receive from the gNB in system information an indication of one or more of the following features: (i) its use/support of earth-fixed virtual cells, (ii) the need for the UE to report its GNSS-based location in registration/tracking area update related AS/NAS messages, and (iii) the need for the UE to report its GNSS-based location in registration/tracking area update related AS/NAS messages. In the absence of one or more of such indications, the reporting can be made mandatory for the UE via specifications or rules.

In step 2002, the UE checks if it is time to perform initial registration or registration update. If yes, the UE goes to step 2003. Otherwise, the UE goes to step 2001 to receive any updates from periodic SIB broadcast.

In step 2003, the UE sends an RRC message that encapsulates a NAS message to get registered with the core network. In an LTE network, the UE may encapsulate the NAS attach request message in the RRC connection setup complete message. In a 5G network, the UE may encapsulate the NAS registration request in the RRC Setup complete message. The NAS message, attach request, or registration request, contains the last visited registered TAI if available.

In step 2003, in an example embodiment of the present disclosure, when the UE sends to the network a registration request message including one or more of the following: (i) TAIs observed by the UE, (ii) its GNSS-based location along with an indication about the UE's confidence on the accuracy of this location with possible indication of "GNSS not visible/GNSS visibility poor/GNSS visible," for example, the accuracy of the location can be also implicitly included in the GNSS-based location information, (iii) its virtual cell ID, (iv) time stamp associated with the GNSS-based location, and (v) estimated speed and direction of travel (if available).

In an embodiment of the disclosure, in step 2003, the UE provides the most recent measurements (e.g., RSRPs, time delays, and/or timing advance) of the serving cell and up to N neighboring cells (where applicable) in an RRC message that accompanies the NAS registration request message. These measurements enable the gNB/eNB to determine or validate the virtual cell ID or the GNSS-based UE location.

In step 2004, the UE checks if the response message has been received or not. If yes, the UE goes to step 2005. Otherwise, the UE goes to step 2002.

In step 2005, the UE receives an RRC message (e.g., RRC reconfiguration in 5G and RRC connection reconfiguration in LTE). Such message contains the NAS registration accept/attach accept message.

The UE stores the TAI List so that the UE can decide in step 2002 when to carry out a mobility registration update. For example, if the UE detects that the UE has entered a TA that is not in the TAI List, the UE initiates the mobility related registration update by sending a message such as registration request in 5G and tracking area update request in LTE in step 2003.

In an LTE network, after the attach procedure has been carried out, the tracking area update (TAU) occurs using the NAS messages tracking area update request and tracking area update accept, which replace the NAS messages attach request and attach accept, respectively, in FIG. 20.

In an example embodiment of the present disclosure, in step F5S2 of FIG. 18, the gNB constructs the SIB (e.g., SIB1) so that such SIB includes the TAIs associated with the earth-fixed TAs expected to be illuminated by the cell not merely at the current time but over multiple (e.g., 1 or more) SIB time windows in future. This approach prevents frequent processing at the gNB at the expense of a longer TAI list.

For example, if the gNB's cell illuminates TA1 and TA2 at the current instant (i.e., the instant when a SIB is being created) but may illuminate TA2 and TA3 within the target period of SIB transmission (e.g., 160 ms for SIB1), the gNB broadcasts the identities of (TA1, TA2, and TA3) in the SIB. This may enable the UE located in TA3 to find a match with its current TA. If the gNB only broadcasts TA1 and TA2, the UE may not find a TAC/TAI match with the broadcast TACs/TAIs and hence would need to do a TAC/TAI update or registration update.

In another embodiment of the present disclosure, the gNB constructs a SIB (carrying TACs/TAIs) such that the SIB receive times at UEs in the NTN cell match the beam's coverage of earth-fixed TAs at such receive times. In other words, the gNB considers the earth-fixed TAs being illuminated at a receive instant of a SIB instead of a transmit instant of a SIB. Note that there would be gNB-NTN-GW delay, NTN-GW-platform delay, and platform-UE delay for a transparent payload between the SIB creation at the gNB and the SIB reception by the UE. In an example approach, the gNB considers both the minimum UE-gNB delay and the maximum UE-gNB delay in the cell to estimate the validity of the SIB content (e.g., earth-fixed TAs being illuminated during a given period).

In an embodiment of the present disclosure, after the registration is completed or updated, upon cell reselection or handover to a new cell, the UE is not required to compare its TAI List with the TAIs broadcast by the gNB more than once. This saves the UE processing power and increases the UE battery life.

In an embodiment of the present disclosure, in step F5S5 of FIG. 18, after determining the identity of the earth-fixed TA (and the identity of the earth-fixed virtual cell), the gNB provides such identity to the AMF even though the gNB's cell may be illuminating multiple other fixed-earth TAs. Additionally, the gNB may provide identities of multiple earth-fixed TAs (and identities of one or more virtual cells) if a UE is near the border of two or more earth-fixed virtual cells or two or more earth-fixed TAs. In another example approach, the gNB provides a single identity of the earth-fixed TA (and a single identity of the earth-fixed virtual cell) and the AMF identifies neighboring TAs and virtual cells.

In an embodiment of the present disclosure, in step F5S6 of FIG. 18, the AMF considers the satellite movement to determine a compact TAI List. For example, in case of earth-moving cells moving from the east to the west, the AMF may include the TAIs in the east of the current TA and exclude the TAIs in the west of the current TA. In another approach, the AMF combines the knowledge of the UE's GNSS-based location (possibly speed and direction of travel as well) along with one or more of (i) UE/gNB-reported or self-determined virtual cell(s), (ii) UE/gNB-reported or self-determined virtual TAs, and (iii) satellite movement to create a compact TAI List (=Registration Area) for the UE.

The UE does not carry out a TAU/registration update as long as at least one TAC/TAI in the TAI list (provided by the AMF) is in the list of TACs/TAIs being broadcast by a gNB in a cell.

In an embodiment of the present disclosure, the AMF indicates to the UE the identity of the earth-fixed TA (i.e., TAI) where the UE is currently located in a NAS message such as registration accept. Such identity is explicitly indicated by the AMF in one approach. In another approach, an implicit indicator is used to identify such TAI; the first TA ID in the TAI list can correspond to the TA where the UE is located.

In an example embodiment of the present disclosure, to convey the UE's GNSS-based location (possibly speed and direction of travel as well) and/or the identities of one or more virtual cells, the gNB uses an existing IE of user location information in NGAP signaling messages (e.g., INITIAL UE MESSAGE and UPLINK NAS TRANSPORT). In another approach, a new IE is introduced in NGAP signaling messages to convey the UE's GNSS-based location (possibly speed and direction of travel as well) and/or the identities of one or more virtual cells. In one example implementation, CGI (Cell Global Identity) inside user location information can be reused to convey the identity of a single or multiple virtual cells. Additional IEs are introduced in another example implementation to convey the identity of a single or multiple virtual cells.

In an example embodiment of the present disclosure, to convey the identities of one or more earth-fixed TAs, the gNB uses an existing IE of user location information in NGAP signaling messages (e.g., INITIAL UE MESSAGE and UPLINK NAS TRANSPORT). In another approach, a new IE is introduced in NGAP signaling messages to convey the identities of one or more earth-fixed TAs. In one example implementation, TAI inside user location information can be reused to convey the identity of a single or multiple earth-fixed TAs. Additional IEs are introduced in another example implementation to convey the identity of a single or multiple earth-fixed TAs.

In an example embodiment of the present disclosure, in NAS messages (e.g., registration request), the UE includes multiple TAIs in an existing IE "last visited registered TAI," where these TAIs reflect multiple TAIs being broadcast by the gNB. In another approach, a new IE is introduced to accommodate multiple TAIs. In yet another example approach, the UE includes a single TAI in the existing IE "last visited registered TAI" or in a new IE, where such TAI reflects the earth-fixed TA where the UE is located or where the UE had carried out last successful registration/registration update. In an example implementation, the AMF conveys identity of such single TAI in a NAS message such as registration accept. As mentioned earlier, such TAI could be the first TAI in the TAI list specified by the AMF.

In an example embodiment of the present disclosure, to convey one or more of (i) its GNSS-based location (possibly speed and direction of travel as well) (ii) the identities of one or more virtual cells, and (iii) the identities of one or more earth-fixed TAs, the UE uses a new IE in RRC signaling messages (e.g., RRCSetupComplete and ULInformationTransfer) to make the gNB aware of such UE-specific information.

Figure 21:
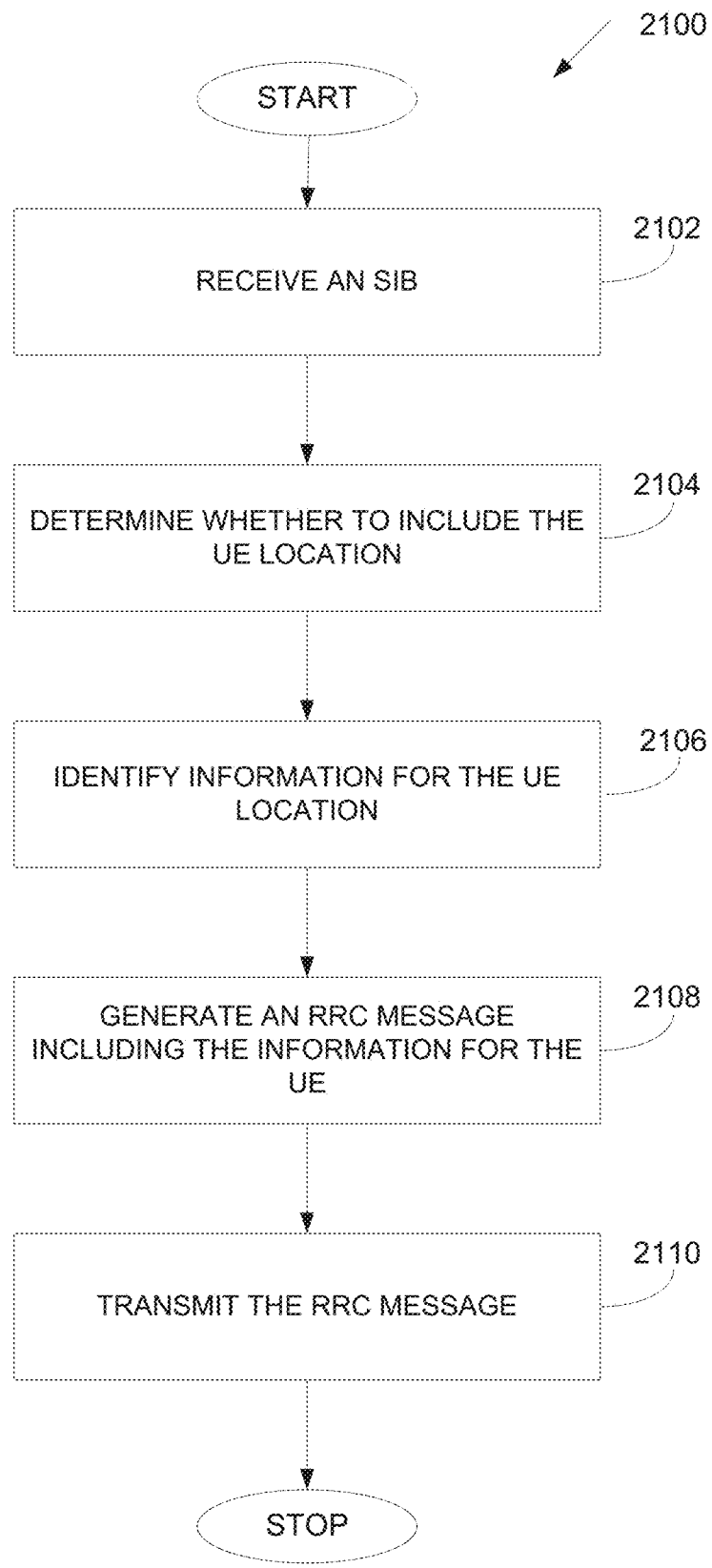
FIG. 21 illustrates a flowchart of a method for measurement of TAI updates in an NTN according to embodiments of the present disclosure.

FIG. 21 illustrates a flowchart of a method 2100 for measurement of TAI updates in an NTN according to embodiments of the present disclosure. For example, the method 2100 as may be performed by a UE such as 111-116 as illustrated in FIG. 1. An embodiment of the method 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions.

As illustrated in FIG. 21, the method 2100 begins at step 2102. In step 2102, the UE receives, from a BS, an SIB including multiple TAIs and an indication of whether to include a UE location in an NAS registration/tracking area update operation.

In step 2104, the UE determines whether to include the UE location based on the indication.

In step 2106, the UE identifies information for the UE location.

In one embodiment, in step 2106, the information for the UE location comprises at least one of GNSS-based UE location information, a TAI of the UE, and a cell ID of the UE.

In step 2108, the UE generates an RRC message including the information for the UE location, wherein the RRC message encapsulates a NAS message.

In step 2110, the UE transmits, to the BS, the RRC message including the information for the UE location.

In one embodiment, the UE generates the GNSS-based UE location information with an accuracy level of the UE location.

In one embodiment, the UE generates the GNSS-based UE location information including at least one of a time stamp associated with the UE location, an estimated UE speed, and an estimated UE travel direction.

In one embodiment, the UE receives the SIB including the TAIs that comprises a first set of TAs and a second set of TAs. In such embodiment, the first set of TAs is a current set of TAs identified by a current beam from a cell of the BS and the second set of TAs is a reserved set of TAs for the cell of the BS.

In one embodiment, the UE identifies the TAIs including a common part of TAIs located in common portions of broadcasting signal received from the BS and a dedicated part of TAIs located in specific portions of the broadcasting signal received from the BS.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver configured to receive, from a base station (BS), a system information block (SIB) including multiple tracking area identities (TAIs) and an indication of whether to include a UE location in a non-access stratum (NAS) registration/tracking area update operation; and
   a processor operably coupled to the transceiver, the processor configured to:
   determine whether to include the UE location based on the indication;
   identify information for the UE location; and
   generate a radio resource control (RRC) message including the information for the UE location, wherein the RRC message encapsulates a NAS message,
   wherein the transceiver is further configured to transmit, to the BS, the RRC message including the information for the UE location.

2. The UE of claim 1, wherein the information for the UE location comprises at least one of GNSS-based UE location information, a TAI of the UE, and a cell identification (ID) of the UE.

3. The UE of claim 2, wherein:
   the processor is further configured to generate the GNSS-based UE location information with an accuracy level of the UE location.

4. The UE of claim 2, wherein the processor is further configured to generate the GNSS-based UE location information to include at least one of:
   a time stamp associated with the UE location;
   an estimated UE speed; and
   an estimated UE travel direction.

5. The UE of claim 1, wherein:
   the transceiver is further configured to receive the SIB including the TAIs that comprises a first set of tracking areas (TAs) and a second set of TAs;
   the first set of TAs is a current set of TAs identified by a current beam from a cell of the BS; and
   the second set of TAs is a reserved set of TAs for the cell of the BS.

6. The UE of claim 1, wherein the processor is further configured to identify the TAIs including a common part of TAIs located in common portions of broadcasting signal received from the BS and a dedicated part of TAIs located in specific portions of the broadcasting signal received from the BS.

7. A method of a user equipment (UE) in a wireless communication system, the method comprising:
   receiving, from a base station (BS), a system information block (SIB) including multiple tracking area identities (TAIs) and an indication of whether to include a UE location in a non-access stratum (NAS) registration/tracking area update operation;
   determining whether to include the UE location based on the indication;
   identifying information for the UE location;
   generating a radio resource control (RRC) message including the information for the UE location, wherein the RRC message encapsulates a NAS message; and
   transmitting, to the BS, the RRC message including the information for the UE location.

8. The method of claim 7, wherein the information for the UE location comprises at least one of GNSS-based UE location information, a TAI of the UE, and a cell identification (ID) of the UE.

9. The method of claim 8, further comprising generating the GNSS-based UE location information with an accuracy level of the UE location.

10. The method of claim 8, further comprising generating the GNSS-based UE location information including at least one of:
   a time stamp associated with the UE location;
   an estimated UE speed; and
   an estimated UE travel direction.

11. The method of claim 7, further comprising receiving the SIB including the TAIs that comprises a first set of tracking areas (TAs) and a second set of TAs,
   wherein:
      the first set of TAs is a current set of TAs identified by a current beam from a cell of the BS; and
      the second set of TAs is a reserved set of TAs for the cell of the BS.

12. The method of claim 7, further comprising identifying the TAIs including a common part of TAIs located in common portions of broadcasting signal received from the BS and a dedicated part of TAIs located in specific portions of the broadcasting signal received from the BS.

13. A base station (BS) in a wireless communication system, the BS comprising:
   a processor configured to generate an indication indicating whether to include a user equipment (UE) location; and
   a transceiver operably coupled to the processor, the transceiver configured to:
      transmit, to a UE, a system information block (SIB) including multiple tracking area identities (TAIs) and the indication in a non-access stratum (NAS) registration/tracking area update operation, and
      receive, from the UE, a radio resource control (RRC) message including information for the UE location, wherein the RRC message encapsulates a NAS message.

14. The BS of claim 13, wherein the information for the UE location comprises at least one of GNSS-based UE location information, a TAI of the UE, and a cell identification (ID) of the UE.

15. The BS of claim 14, wherein the processor is further configured to identify the GNSS-based UE location information with an accuracy level of the UE location.

16. The BS of claim 14, wherein the processor is further configured to identify the GNSS-based UE location information including at least one of:
   a time stamp associated with the UE location;
   an estimated UE speed; and
   an estimated UE travel direction.

17. The BS of claim 13, wherein:
   the transceiver is further configured to transmit the SIB including the TAIs that comprises a first set of tracking areas (TAs) and a second set of TAs;
   the first set of TAs is a current set of TAs identified by a current beam from a cell of the BS; and
   the second set of TAs is a reserved set of TAs for the cell of the BS.

18. The BS of claim 13, wherein the processor is further configured to generate the TAIs including a common part of TAIs located in common portions of broadcasting signal for transmitting to the UE and a dedicated part of TAIs located in specific portions of the broadcasting signal for transmitting to the UE.

19. The BS of claim 13, wherein the processor is further configured to:
   determine the TAIs based on the UE location;
   select access and mobility management function/mobile management entity (AMF/MME) based on the TAIs; and
   send, to the AMF/MME, an initial UE message/uplink NAS transport using a next generation application protocol/S1 application protocol (NGAP/S1AP).

20. The BS of claim 19, wherein the initial UE message/uplink NAS transport includes at least one of UE-reported location information, a set of gNB determined TAIs, a physical cell global ID, and a virtual cell global ID.

* * * * *